US012719531B2

(12) United States Patent
Khaira et al.

(10) Patent No.: US 12,719,531 B2
(45) Date of Patent: Aug. 25, 2026

(54) REMOTE CONTROLLED RECONFIGURABLE INTELLIGENT SURFACE WITH MODULAR SCALABLE DESIGN FOR FLEXIBLE RADIO COVERAGE WITH ADJUSTABLE SIGNAL STRENGTH

(71) Applicant: Dell Products L.P., Round Rock, TX (US)

(72) Inventors: Navjot Kaur Khaira, Kanata (CA); Tejinder Singh, Kanata (CA)

(73) Assignee: DELL PRODUCTS L.P., Round Rock, TX (US)

(*) Notice: Subject to any disclaimer, the term of this patent is extended or adjusted under 35 U.S.C. 154(b) by 269 days.

(21) Appl. No.: 18/536,565

(22) Filed: Dec. 12, 2023

(65) Prior Publication Data

US 2025/0192826 A1 Jun. 12, 2025

(51) Int. Cl.
*H04B 7/04* (2017.01)
*H04W 16/28* (2009.01)

(52) U.S. Cl.
CPC ........ *H04B 7/04013* (2023.05); *H04W 16/28* (2013.01)

(58) Field of Classification Search
CPC .......................... H04B 7/04013; H04W 16/28
See application file for complete search history.

(56) References Cited

U.S. PATENT DOCUMENTS 9,852,079 B2 12/2017 Kepner
12,512,879 B2 12/2025 Bai
(Continued)

FOREIGN PATENT DOCUMENTS

CN 115334521 A * 11/2022 ............ H04W 16/22
EP 3 729 038 B1 4/2025
(Continued)

OTHER PUBLICATIONS

International Search Report and Written Opinion mailed Jan. 24, 2025 for PCT Application No. PCT/US2024/013740, 24 pages.
(Continued)

*Primary Examiner* — Samina F Choudhry
(74) *Attorney, Agent, or Firm* — Amin, Turocy & Watson, LLP

(57) ABSTRACT

The technology described herein is directed towards remotely controlling the direction and the signal strength of a beam reflected from a reconfigurable intelligent surface. A modular design of interconnected, communicatively coupled fundamental modules of unit cells facilitates a straightforward assembly process in which the aperture of the reconfigurable intelligent surface can be scaled by tiling together the modules. The reconfigurable intelligent surface aperture can be remotely fine-tuned with respect to gain and beam reflection direction upon receiving a control signal (e.g., a nine-bit digital code through infrared). Depending on a given scenario, the reflected beam be controlled to reflect an electromagnetic wave (e.g., mmWave) as a concentrated, high-gain coverage beam in a specified direction, a more expansive, low-gain coverage area beam in the specified direction, or something in between, e.g., medium signal strength and medium coverage area.

20 Claims, 19 Drawing Sheets

(56) References Cited

U.S. PATENT DOCUMENTS

| | | | | |
|---|---|---|---|---|
| 12,609,732 | B2 | 4/2026 | Sahraei | |
| 2017/0084306 | A1* | 3/2017 | Xia | G11B 5/59622 |
| 2021/0232240 | A1* | 7/2021 | Smith | G06F 3/0446 |
| 2022/0377730 | A1 | 11/2022 | Yang et al. | |
| 2023/0129288 | A1 | 4/2023 | Sun et al. | |
| 2023/0209642 | A1* | 6/2023 | Jiang | H04W 52/028 370/328 |
| 2023/0216572 | A1 | 7/2023 | Elshafie | |
| 2023/0258759 | A1 | 8/2023 | Wang et al. | |
| 2023/0268650 | A1* | 8/2023 | Swartz | H01Q 3/46 455/411 |
| 2023/0361816 | A1 | 11/2023 | Yang et al. | |
| 2023/0370958 | A1* | 11/2023 | Gunzelmann | H04W 36/06 |
| 2024/0056129 | A1 | 2/2024 | Duan | |
| 2024/0097743 | A1 | 3/2024 | Bhamri et al. | |
| 2024/0337722 | A1 | 10/2024 | Shrivastava et al. | |
| 2024/0364434 | A1 | 10/2024 | Sahraei | |
| 2024/0365152 | A1 | 10/2024 | Elshafie | |
| 2024/0380438 | A1 | 11/2024 | Elshafie | |
| 2024/0413868 | A1 | 12/2024 | Haghighat et al. | |
| 2025/0138179 | A1 | 5/2025 | Fakhreddine | |
| 2025/0150118 | A1 | 5/2025 | Ali et al. | |
| 2025/0202563 | A1 | 6/2025 | Elshafie | |
| 2025/0323689 | A1 | 10/2025 | Jagyasi et al. | |
| 2026/0012227 | A1 | 1/2026 | Albanese | |
| 2026/0025168 | A1 | 1/2026 | Huang | |
| 2026/0088856 | A1 | 3/2026 | Hemadeh | |
| 2026/0113077 | A1 | 4/2026 | Huang | |
| 2026/0121692 | A1 | 4/2026 | Huang | |
| 2026/0142691 | A1 | 5/2026 | Prasad | |
| 2026/0149487 | A1 | 5/2026 | Noh | |
| 2026/0163609 | A1 | 6/2026 | Sahraei | |
| 2026/0180624 | A1 | 6/2026 | Bae | |

FOREIGN PATENT DOCUMENTS

| | | | | |
|---|---|---|---|---|
| JP | 2011130329 A * | 6/2011 | | |
| KR | 10-2022-0125294 A | 9/2022 | | |
| WO | 2023/161428 | 8/2023 | | |
| WO | WO-2023230300 A1 * | 11/2023 | | H04W 24/10 |
| WO | WO-2024125781 A1 * | 6/2024 | | H04L 25/0248 |

OTHER PUBLICATIONS

Sayanskiy Andrey et al: "A 2D-Programmable and Scalable Reconfigurable Intelligent Surface Remotely Controlled via Digital Infrared Code", IEEE Transactions on Antennas and Propagation, vol. 71, No. 1, Jan. 2023, 11 pages.

Kisseleff Steven et al: "Reconfigurable Intelligent Surfaces in Challenging Environments: Underwater, Underground, Industrial and Disaster", IEEE Access, Special Section on Reconfigurable Intelligent Surgace Aided Communications for 6G and Beyond, vol. 9, Nov. 2021, 20 pages.

N. Kaina, M. Dupre, G. Lerosey, and M. Fink, "Shaping complex microwave fields in reverberating media with binary tunable metasurfaces," Scientific Reports, vol. 4, pp. 1-7, Published: Oct. 21, 2014. 8 pages.

Caner Guclu, Julien Perruisseau-Carrier, and Ozlem Aydin Civi. "Proof of Concept of a Dual-Band Circularly-Polarized RF MEMS Beam-Switching Reflectarray" IEEE Transactions on Antennas and Propagation, vol. 60, No. 11, Nov. 2012, 5 pages.

Khaira, et al. "Remote Controlled Reconfigurable Intelligent Surface", U.S. Appl. No. 18/640,596, filed Apr. 19, 2024, 37 pages.

ETSI GR RIS 001 V1.1.1, "Reconfigurable intelligent surfaces (RIS); Use); Use Cases, Deployment Scenarios and Requirements" Apr. 2023, 29 pages.

ETSI GR RIS 002 V1.1.1, "Reconfigurable intelligent surfaces (RIS); Technological challenges, architecture, and impact on standardization" Aug. 2023, 33 pages.

ETSI GR RIS 003 V1.1.1, "Reconfigurable intelligent surfaces (RIS); Communication Models, Channel Models, Channel estimation and Evaluation Methodology" Jun. 2023, 59 pages.

Invitation to Pay Additional Fees for PCT Application No. PCT/US2024/013740 mailed Sep. 17, 2024, 11 pages.

Lyu et al. "Reconfigurable Intelligent Surface-Assisted Flexible Wireless Network" U.S. Appl. No. 18/758,036, filed Jun. 28, 2024, 36 pages.

Singh et al. "Communication Links Allocation and Slicing of Reconfigurable Intelligent Surface Using Modular Hardware for Flexible Wireless Network" U.S. Appl. No. 18/795,003, filed Aug. 5, 2024, 52 pages.

Zhang, et al., "Future Internet Bandwidth Trends: An Investigation on Current and Future Disruptive Technologies", Secure Systems Lab, Dept. Comput. Sci. Eng., Polytech. Inst. New York Univ., New York, NY, USA, Tech. Rep. TR-CSE-2013-04, Nov. 1, 2013.

Poulakis, "Metamaterials Could Solve One of 6G's Big Problems [Industry View]," in Proceedings of the IEEE, vol. 110, No. 9, pp. 1151-1158, Sep. 2022.

Subrt, et al., "Controlling Propagation Environments Using Intelligent Walls," in 6th European Conference on Antennas and Propagation (EUCAP), Date of Conference: Mar. 26-30, 2012, DOI: 10.1109/EuCAP.2012.6206517.

Kaina, et al., "Shaping complex microwave fields in reverberating media with binary tunable metasurfaces," Scientific Reports, vol. 4, pp. 1-7, Aug. 2017.

Dai, et al., "Reconfigurable Intelligent Surface-Based Wireless Communications: Antenna Design, Prototyping, and Experimental Results," in IEEE Access, vol. 8, pp. 45913-45923, Date of Publication: Mar. 2, 2020, DOI: 10.1109/ACCESS.2020.2977772.

Non-Final Office Action received for U.S. Appl. No. 18/758,036 dated Nov. 21, 2025, 17 pages.

Notice of Allowance received for U.S. Appl. No. 18/640,596 dated Apr. 21, 2026, 9 pages.

Liaskos et al., "End-to-End Wireless Path Deployment with Intelligent Surfaces Using Interpretable Neural Networks", In IEEE Transactions on Communications, vol. 68, No. 11, Nov. 2020, pp. 6792-6806.

Final Office Action received for U.S. Appl. No. 18/758,036 dated Mar. 2, 2026, 17 pages.

Notice of Allowance received for U.S. Appl. No. 18/758,036 dated Jun. 16, 2026, 31 pages.

Notice of Allowance received for U.S. Appl. No. 18/795,003 dated July 7, 110 pages.

* cited by examiner

REMOTE CONTROLLED RECONFIGURABLE INTELLIGENT SURFACE WITH MODULAR SCALABLE DESIGN FOR FLEXIBLE RADIO COVERAGE WITH ADJUSTABLE SIGNAL STRENGTH

BACKGROUND

Reconfigurable intelligent surfaces, also called intelligent reflecting surfaces or metasurfaces, refer to artificially designed structures or surfaces that can manipulate electromagnetic waves in a manner that is not achievable using natural materials. These surfaces can be controlled to produce desired changes in the propagation of the waves, such as reflection, refraction, absorption, and polarization. By controlling the reflection and/or refraction of electromagnetic waves, reconfigurable intelligent surfaces can create more favorable propagation environments, improving signal quality and reducing interference by steering wireless signals to desired areas, thereby enhancing the coverage in shadowed or traditionally weak signal zones.

In general, reconfigurable intelligent surfaces require manual reconfiguration when a wireless environment changes or when there is a need to address a new communication challenge. A wireless environment can change rapidly due to various factors, such as user movement, interference from other devices, and physical obstructions. As wireless communication technologies evolve, the requirements from the network will also change.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
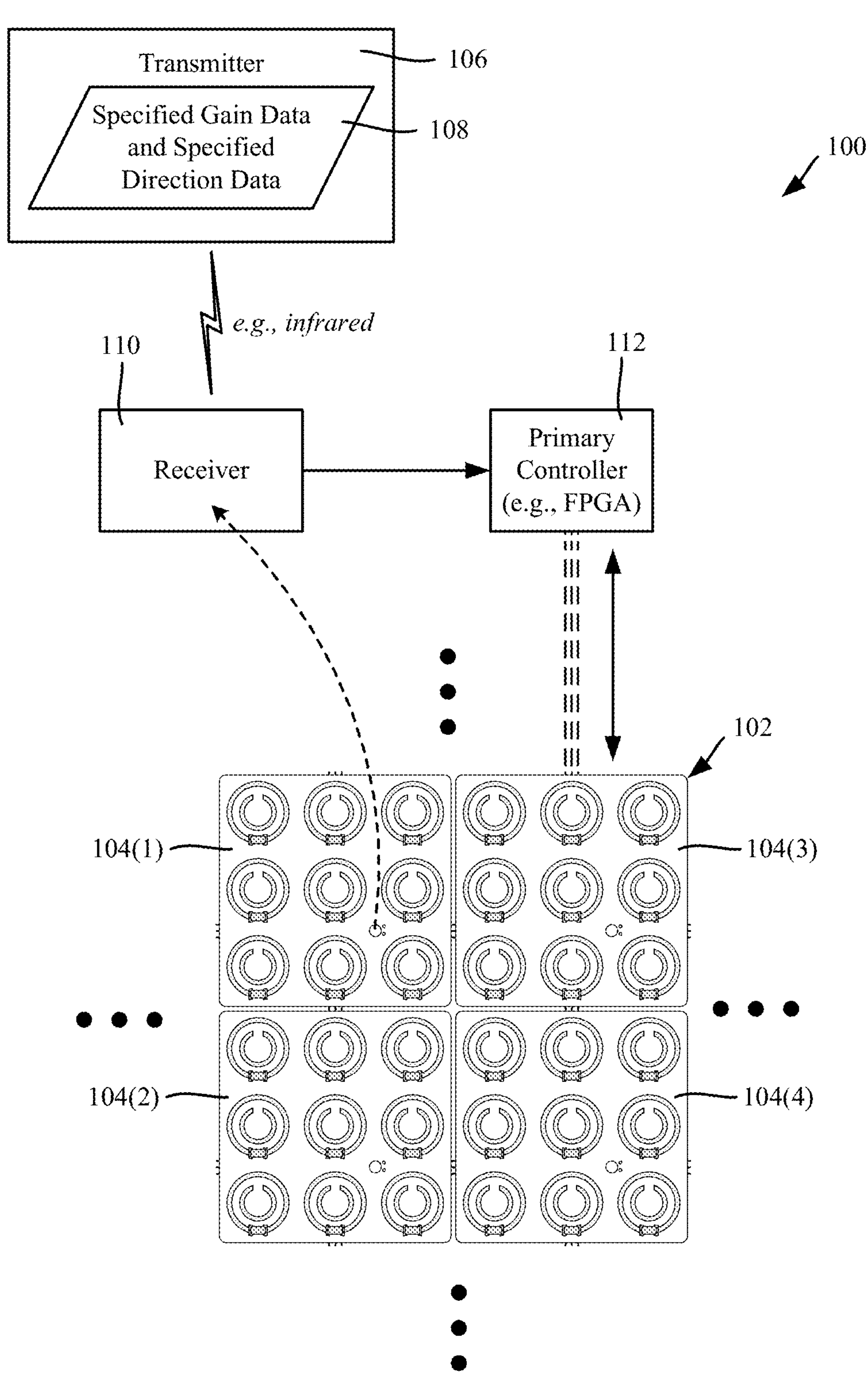
FIG. 1 is a block diagram showing an example system for a remotely controlled reconfigurable intelligent surface with a modular, scalable design, in accordance with various aspects and implementations of the subject disclosure.

Various aspects of the technology described herein are generally directed towards a reconfigurable intelligent surface that is remotely controllable with respect to setting both signal strength and beam direction. In one implementation, the reconfigurable intelligent surface is based on a modular design that is formed via interconnectable modules of unit cells (elements), which facilitates straightforward assembly and scalability with respect to an active reconfigurable intelligent surface aperture. A more extensive reconfigurable intelligent surface aperture can generate a high-gain, focused RF beam, e.g., suited for instances where users are gathered closely. Conversely, for broader coverage needs, the active reconfigurable intelligent surface aperture can be reduced, producing a wider beam with lesser signal gain. Reconfigurable intelligent surface configurations can be customized using a remote control.

In order to provide reconfigurability in the direction of a reflected signal, the reflected elements are able to switch between multiple reflection phases, which is achieved by the use of a tunable capacitor (varactor) in each element, which tunes the reflection phase by switching between an element's different capacitance states. Modularity is achieved by separate j×k (e.g., 3×3) element array modules, which can be interconnected (tiled together) and which are centrally managed by a primary controller. The controller directs microcontrollers in each module to fine-tune the voltage to the varactors, subsequently changing the reconfigurable intelligent surface active aperture's phase profile. With embedded infrared receiver(s), the reconfigurable intelligent surface can decode instructions sent by a (e.g., infrared) transmitter configured for distinct reconfigurable intelligent surface configurations without the constraints of physical connections.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state.

Further, it is to be understood that the present disclosure will be described in terms of a given illustrative architecture; however, other architectures, structures, substrate materials and process features, and steps can be varied within the scope of the present disclosure.

It will also be understood that when an element such as a layer, region or substrate is referred to as being "on" or "over" another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

FIG. 1 shows a generalized block diagram of an example system 100 including a representation of a reconfigurable intelligent surface 102 assembled from modules as described herein. Although four such interconnected modules 104(1)-104(4) are explicitly shown, it will be understood that more modules can be coupled to form a larger reconfigurable intelligent surface, or less modules can be used.

In general and as described herein, a transmitter 106 transmits control signal data representative of specified gain data and specified direction data 108 to a receiver 110. In one implementation, each module (e.g., module 104(1)) contains an instance of a receiver, and the interconnected modules, which are communicatively coupled to one another, synchronize the received information such that only one set of signal data needs to be transmitted to the interconnected modules. Alternatively, instead of having multiple infrared receivers, there can be one central IR receiver, such as coupled to a controller (e.g., the primary controller 112 described below).

In one implementation, the transmitter 106 is an infrared (IR) device, such as a transceiver comprising an IR transmitter (which sends out signals) and an IR receiver (which picks up signals); the transceiver can be implemented in a hand-held or other remote control device. An encoded signal, typically a series of pulses and spaces that represent binary data, is transmitted by the transmitter via an IR LED (light emitting diode) in the transmitter, which emits these signals as pulses of infrared light. An IR receiver (e.g., the receiver 110) detects the pulses of IR light from the transmitter 106 and converts them back into electrical signals. It should be noted that for IR signals there needs to be a clear line-of-sight between the remote and the device being controlled; this can be advantageous in many scenarios where remote functionality is desirable (e.g., without having to plug in a cable) but RF signals can be problematic, e.g., picked up by the wrong receiver, subject to intermittent interference and so on.

One of the modules is communicatively coupled to a controller 112, generally referred to herein as a primary controller 112 to distinguish it from other microcontrollers; (e.g., in one implementation there is one microcontroller per module). In one implementation the primary controller 112 is a modular FPGA (field programmable gate array) device. Upon obtaining the control signal data, e.g., from the module to which the primary controller 112 is coupled, (e.g., the module 104(3) in FIG. 1), the primary controller 112 guides the microcontroller in each module to adjust the individual phase shifts of each module's individual elements (unit cells) as described herein.

Figure 2A:
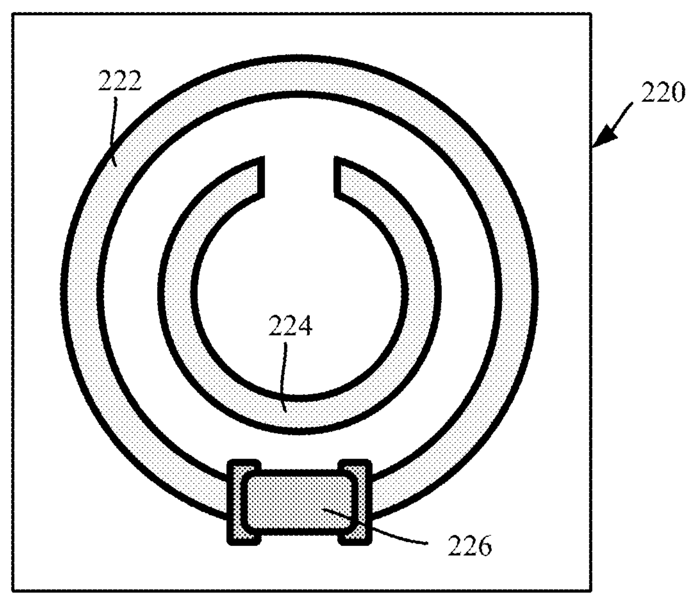
FIGS. 2A and 2B are example top view (FIG. 2A) and three-dimensional perspective view (FIG. 2B) representations of an example unit cell useable with a reconfigurable intelligent surface, in accordance with various aspects and implementations of the subject disclosure.

In FIG. 2A shows an example design of a unit cell (or element) that is part of a module, in which a unit cell is a basic building block of the reconfigurable intelligent surface. By understanding and performing controlled adjustment of each unit cell's properties, the system can predict and manage the overall behavior of the reconfigurable intelligent surface.

Figure 2B:
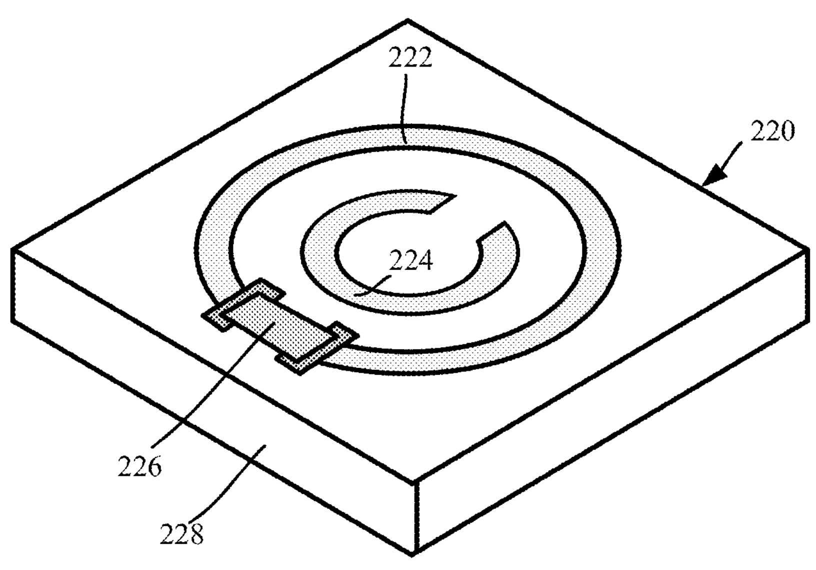

In the example nonlimiting implementation shown in FIGS. 2A (top view) and 2B (three-dimensional perspective view), one design of the unit cell 220 comprises two circular split rings 222 and 224. The outer ring 222 has a tunable capacitor 226, e.g., an integrated varactor that offers a tunable capacitance with voltage. The dimensions of these rings 222 and 224 can be tailored to specific operational frequency ranges for which the unit cell is designed. As is understood, shapes other than circular split rings (e.g., square, rectangular and so on) and other configurations can be used in the construction of a unit cell. These elements can be designed on metallization layer on a (e.g., low-cost) substrate 228 (FIG. 2B).

Figure 3:
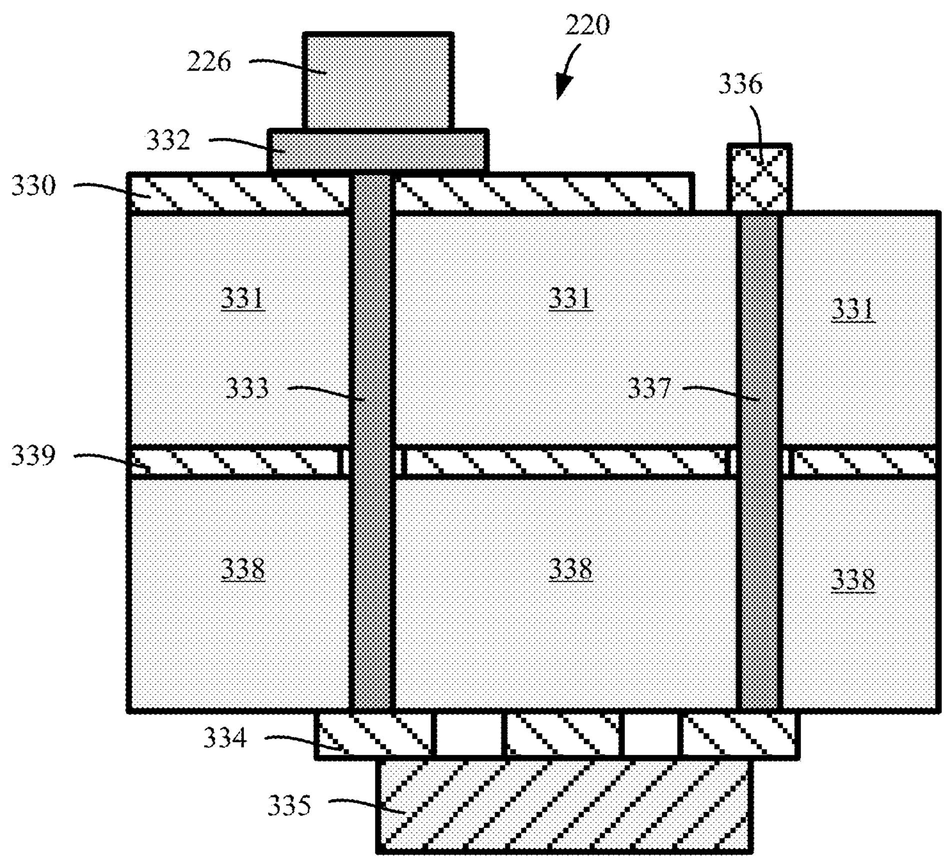
FIG. 3 is a cross-sectional view of an example unit cell useable with a reconfigurable intelligent surface, showing a stack and arrangement of fabricated layers, in accordance with various aspects and implementations of the subject disclosure.

FIG. 3 shows a cross-sectional side view of a nonlimiting fabrication layer stack and arrangement of the unit cell 220. A top metallization layer 330 is patterned on a first substrate layer 331. The unit cells/elements are designed on each cell's metallization layer 330. The surface mounted device (SMD) tunable capacitor 226 can be soldered on top of SMD pads 332 atop the metallization layer 330, with a via 333 (e.g., for voltage control connections of the tunable capacitor 226) to a bottom metallization layer 334 that couples to an SMD microcontroller and power supply controller (PSU)/distribution module 335. The IR receiver 336 is also placed on the first substrate layer 331 with a via 337 to the bottom metallization layer 334/SMD microcontroller and power supply controller 335.

The underside of the first substrate layer 331 is separated from a second substrate layer 338 by a metal plane 339 acting as RF ground. Below the underside of the second substrate layer 338 is the bottom metallization layer 334 which is patterned to form the DC biasing and control circuitry. The controller and the PSU/power distribution module 335 are soldered on this bottom metallization layer 334. To ensure seamless interconnection across the multi-layered stack, the vias 333 and 337 are strategically positioned. For instance, the tunable capacitor 226 (e.g., varactor) is linked to two vias (only one via is represented in the example of FIG. 3): one via connecting its negative terminal to the ground plane 339, while the other via links its positive terminal to the biasing on the bottom metal layer 334.

Figure 4A:
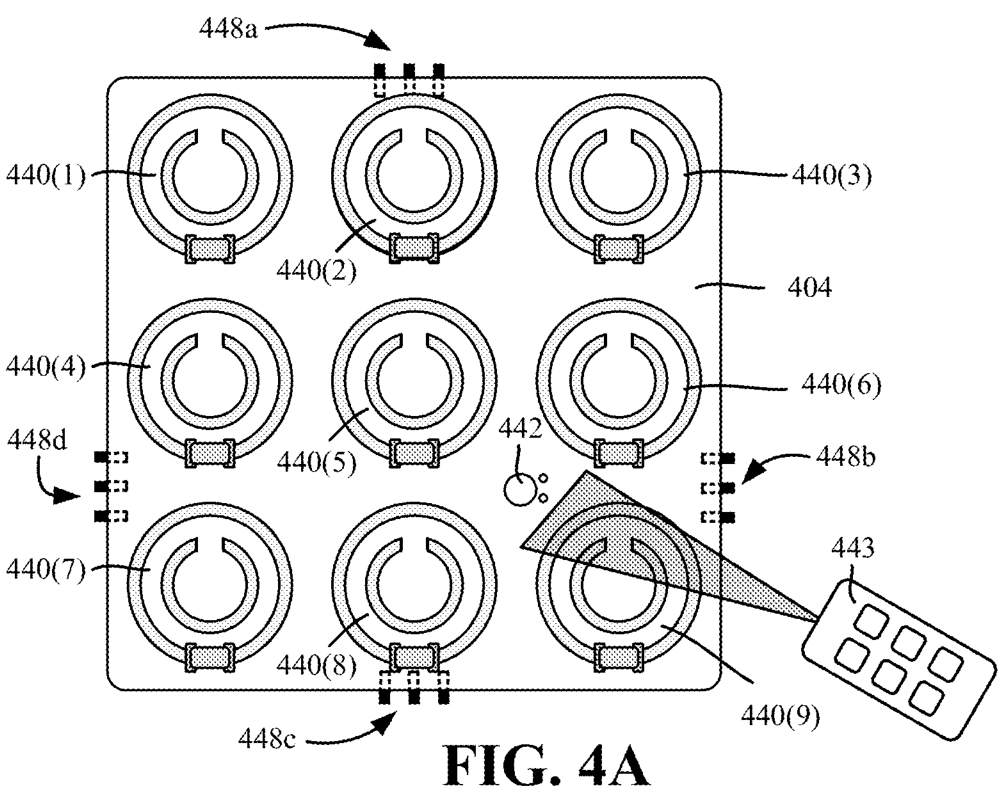
FIGS. 4A and 4B are front and back views, respectively, of an example 3×3 array of unit cells of a module, in accordance with various aspects and implementations of the subject disclosure.

FIG. 4A shows a front view of an example array of nine unit cells 440(1)-440(9) combined in a 3×3 array on a module 404. Although a 3×3 array of unit cells per module are generally used in the examples herein, this is a nonlimiting example, and an array can be composed of j×k unit cells, where j and k are any practical numbers; (typically j=k, but this is not a requirement).

Figure 4B:
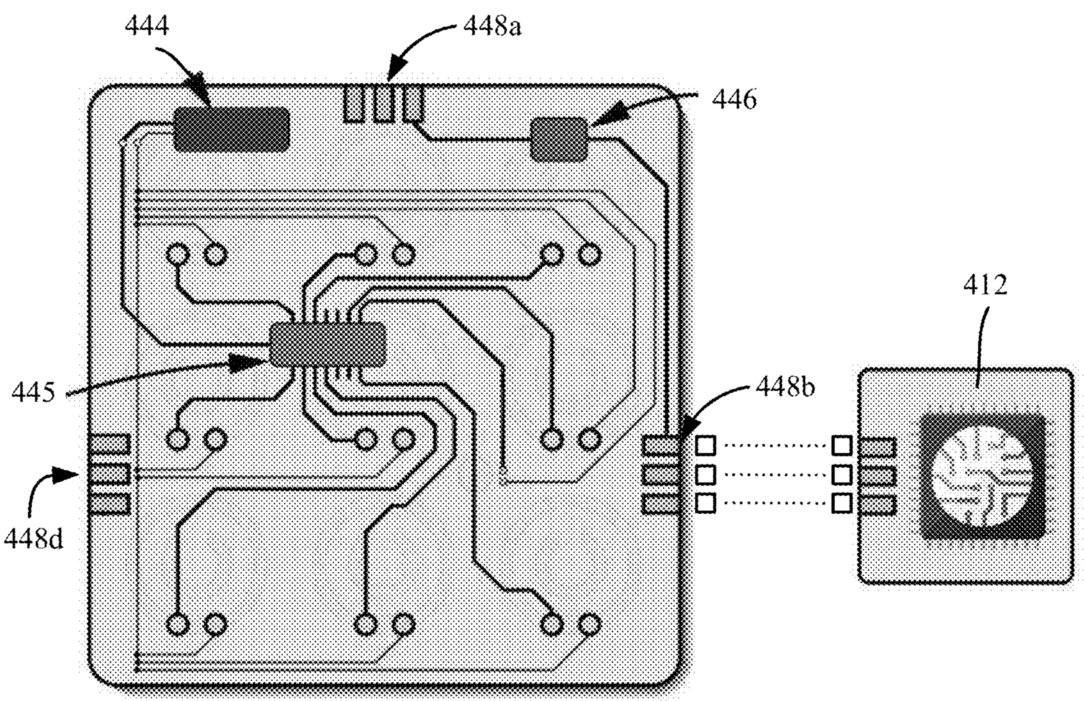

The element (unit cell) designs along with the surface mount devices (SMDs) such as varactors (not individually labeled) and the IR receiver 442 can be seen on the front side view of FIG. 4A. The power distribution module 444, microcontroller 445 and synchronization (sync) module 446 and the metal traces (not separately labeled) providing the voltages to the nine varactors, along with the coupling terminals 448 can be seen on the back side view in FIG. 4B of the module 404.

Significantly, multiple of these modules can be coupled together to form a higher order array (as shown in FIGS. 5-8 for example) using the coupling terminals 448*a*-448*d* (FIG. 4A), shown on each side of the module of FIG. 4A so that any vertically or horizontally adjacent module can be coupled thereto. Note that FIG. 4B omits depicting the coupling terminals 448*c* so as to avoid implying that they are electrically coupled to the varactor ground traces. The coupling terminals (collectively) 448 can be made of magnetic metals to facilitate both physical and electrical coupling.

Figure 5:
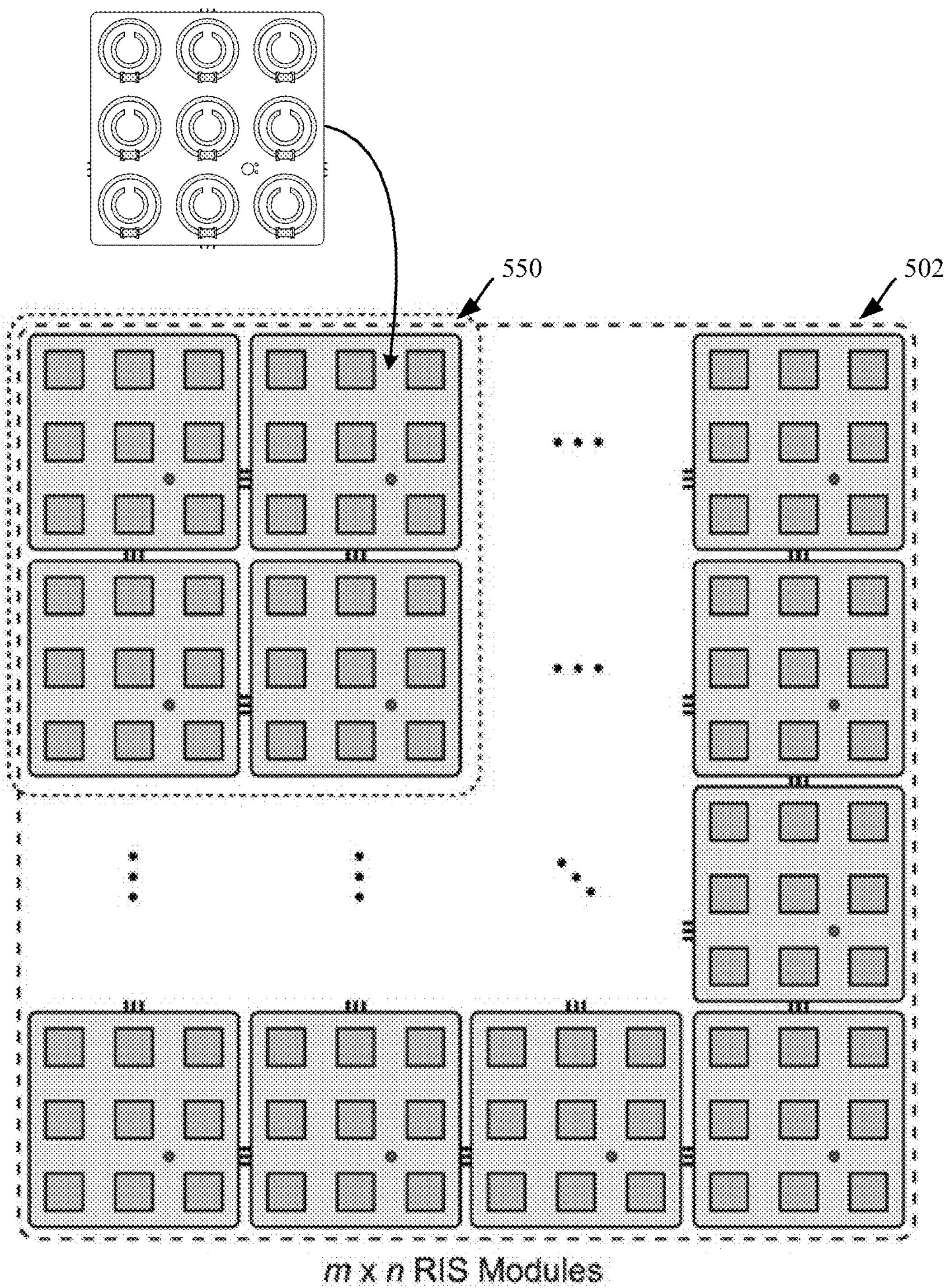
FIG. 5 is a representation of example modules that can be connected together to form a higher order m×n reconfigurable intelligent surface array, in accordance with various aspects and implementations of the subject disclosure.

In general, as shown in FIG. 5, in which the unit cells of the modules are symbolically represented by squares and the IR receiver represented by a small dot/circle in each module, the coupling terminals provide a sync between the connected modules ("tiles") of a reconfigurable intelligent surface 550 using the sync module 446 (FIG. 4B) and one module and a primary modular (FPGA) controller 412. In FIG. 5, multiple modules of j×k (3×3 in this example) unit cells are connected together to form a higher order m×n reconfigurable intelligent surface array. A significant benefit of using this approach is scalability; larger reconfigurable intelligent surfaces with larger numbers of elements offer a higher gain to the reflected signal, and vice versa for less elements and lower gain. Hence, depending on the signal strength desired, the size of the reconfigurable intelligent surface can be scaled up or down based on the number of modules. For example, a small reconfigurable intelligent surface can be formed with the 2×2 array of modules (dashed block 550) or can be enlarged into an m×n array by adding modules. As little as a single module may be sufficient for some applications, e.g., if 25 unit cells are all that are needed for a low-signal strength application, a single 5×5 array of unit cells can be built into a module; (a "module" may not be needed; however an advantage of using a module as described herein allows for future expansion).

In one implementation, the signal from the IR transmitter 443 (FIG. 4A) comprises a nine-bit digital code out of which the first four bits define the amount of gain that the reconfigurable intelligent surface is to provide, and the remaining five bits define the direction of the reflected signal. If the first four bits of IR code are 0000, it means the minimum modules in the reconfigurable intelligent surface are activated and the surface offers a gain of 0 dB to the reflected signal. For the first four bits IR code 0001, a larger surface of reconfigurable intelligent surface is activated and a gain of 5 dB is provided to the reflected signal, and so on, as generally shown in the examples of FIGS. 6-8.

Figure 6:
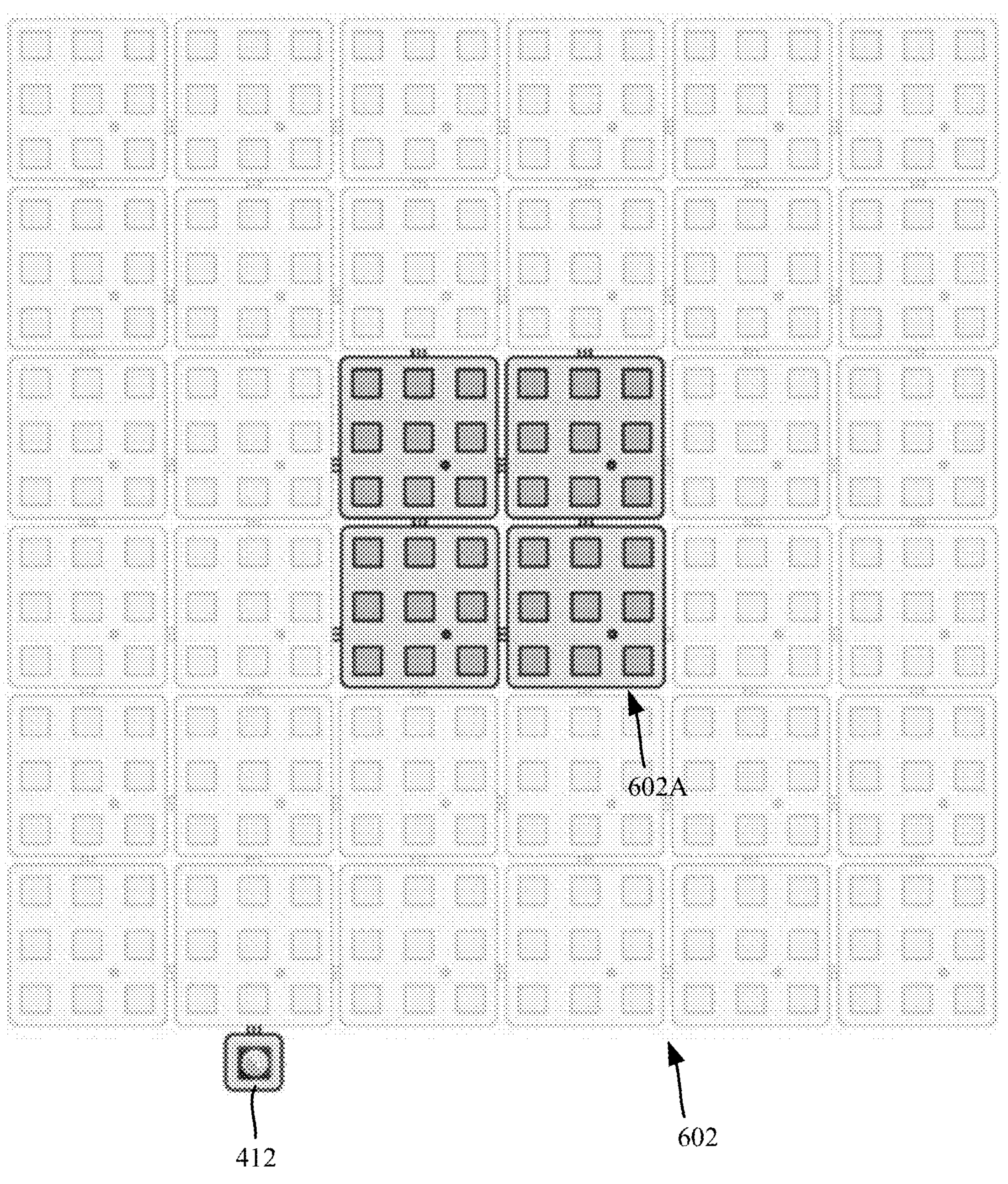
FIGS. 6-8 are representations of example configurations of a reconfigurable intelligent surface with different active apertures for wireless signal reflection, in accordance with various aspects and implementations of the subject disclosure.

By way of example, FIG. 6 shows a top view of a scalable m×n (6×6) module array of 3×3 unit cell array modules forming a reconfigurable intelligent surface 604. In one implementation, the microcontroller at the back of each module has a read-only-memory component that decodes the reconfigurable intelligent surface configuration corresponding to a code sequence, e.g., based on the IR control signal.

Figure 7:
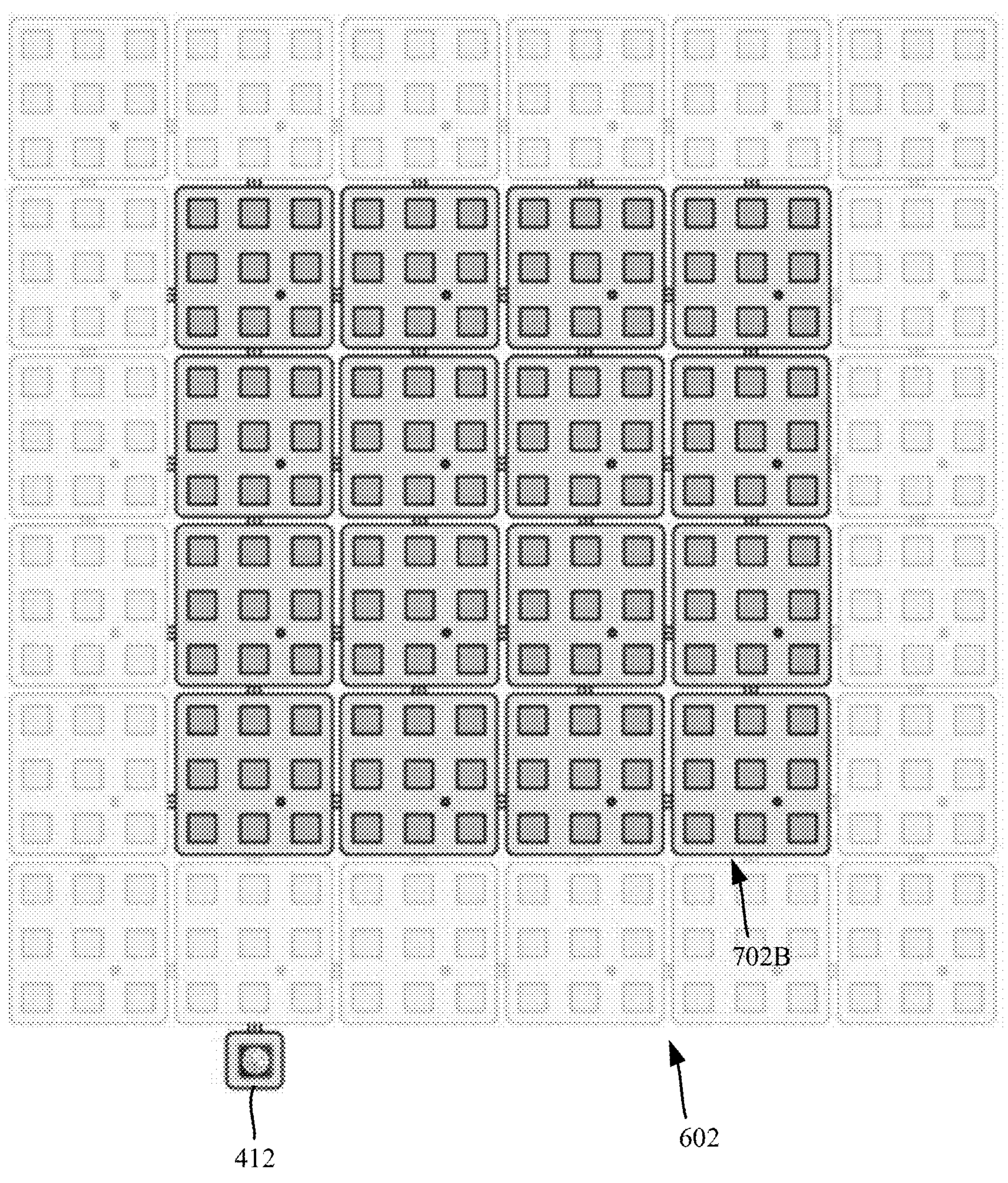
Figure 8:
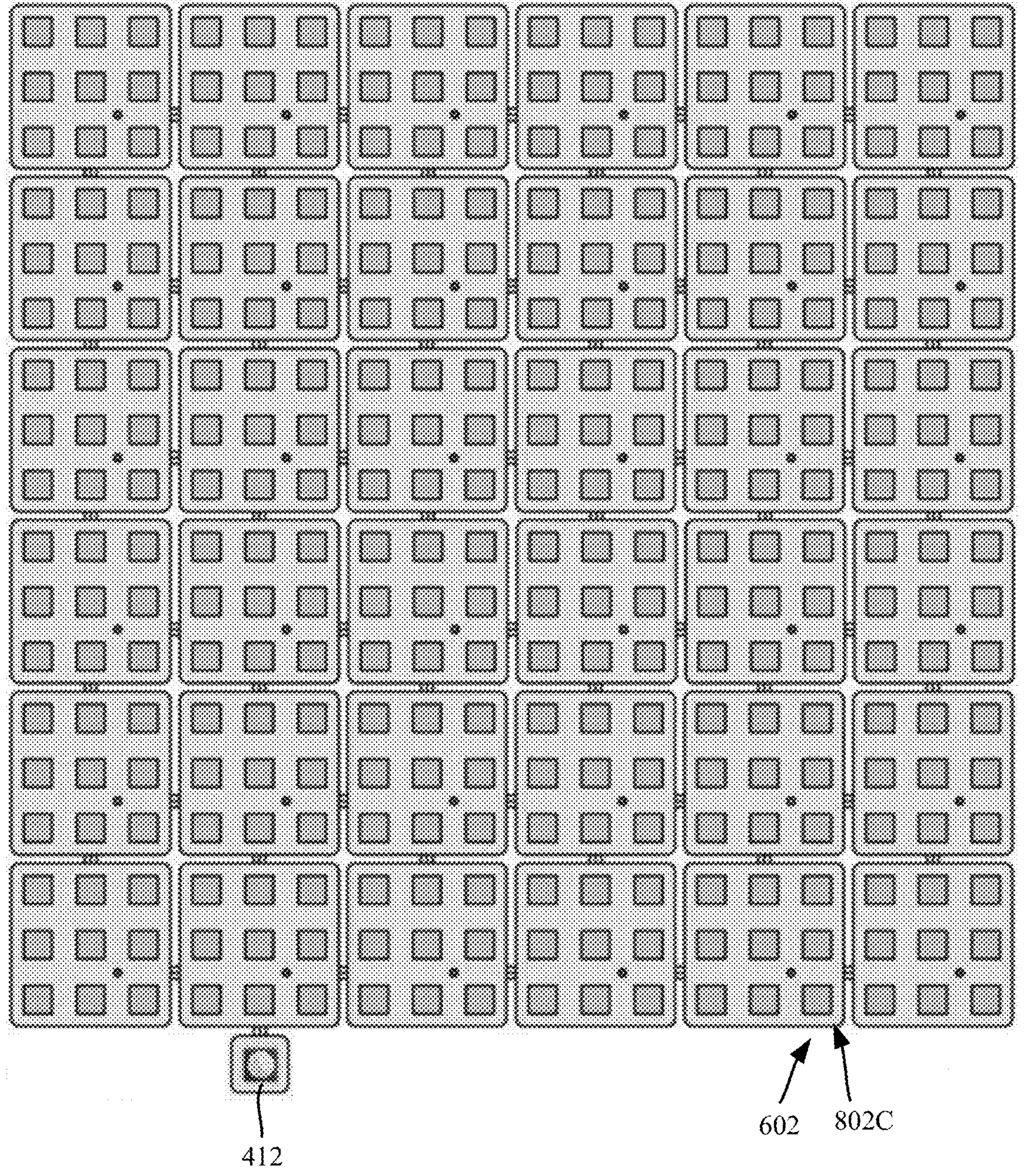

The surface of a reconfigurable intelligent surface 602 is scalable depending on the amount of gain needed from the reflected signal with larger surface offering larger gain as shown in FIGS. 6-8 (configurations 602A-802C, respectively). In configuration 602A, only a 2×2 module array can be considered "active" with respect to the active reconfigurable intelligent surface aperture, in configuration 702B, only a 4×4 module array is considered active, and in configuration 802C the entire 6×6 module array is considered active. This is achieved by providing voltage to the varactors accordingly.

In one implementation, the gain can be represented by a four-bit digital sequence. For example, the gain can be controlled in increments of 5 dB for the consecutive numbers in the four-bit digital sequence, with 1000 binary corresponding to the maximum gain of 40 dB; (finer increments can be used by using all of the sixteen bit value combinations 0000-1111 to range from 0 dB to 40 dB, for example). The primary FPGA controller 412 provides the sync signal to the magnetic coupling terminals, dictating the signal to the microcontrollers behind each module. As can be readily appreciated, this sequence is only one non-limiting example, and for example other digital sequences can also be used. For example, there can be additional bits for even finer resolution of gain and/or reflection direction. There also can be more or different bits so as to distinguish among modules/reconfigurable intelligent surfaces, such as with a scenario where multiple reconfigurable intelligent surfaces ae arranged in such a way that even line-of-sight can be insufficient; (for example, consider two reconfigurable intelligent surfaces mounted on a very high ceiling that can pick up the control signals intended for only one of the surfaces. It may be impractical for the remote control user to get closer via a ladder or the like every time a change is needed). In this scenario additional bits can be used and known to the modules/primary controller to indicate to which surface a control signal is intended.

The gain provided to the reflected signal can be adjusted during initial reconfigurable intelligent surface assembly, as well as also controlled remotely via IR commands as described herein. Synchronization between the modules is maintained by using a primary modular controller 412 and the sync module instance (e.g., 446 FIG. 4B) on each module. Because the magnetic coupling and sync terminals are present on the modules, the primary modular controller 412 can be attached to any one module on the outer periphery of the reconfigurable intelligent surface aperture. This primary modular controller 412 provides instructions to the microcontrollers behind each module (e.g., the microcontroller 445 of FIG. 4B).

The direction of the reflected signal from the active aperture arrays of the reconfigurable intelligent surface is dictated by a phase profile over the reconfigurable intelligent surface. The phase profile corresponds to how much phase shift each element in reconfigurable intelligent surface presents such that the phase shifts combine to reflect the incoming signal in the desired direction along with a certain gain. Closed-form equations can be used to determine the phase profiles for the expected reflected angle direction and gain for any a m×n reconfigurable intelligent surface array.

To change the phase shifts of each module's elements, the microcontroller alters the voltage distributed to each of the varactors, which switches the varactors of the elements between capacitance states. As described above, the varactors can be surface mounted/soldered on the top surface with two vias per varactor to connect the diodes to the ground and the bottom layer, respectively. The voltage combinations of the varactors corresponding to each received IR command are stored in the ROM of the microcontroller, whereby the microcontroller individually controls the varactors in its module's 2D array.

Figure 9A:
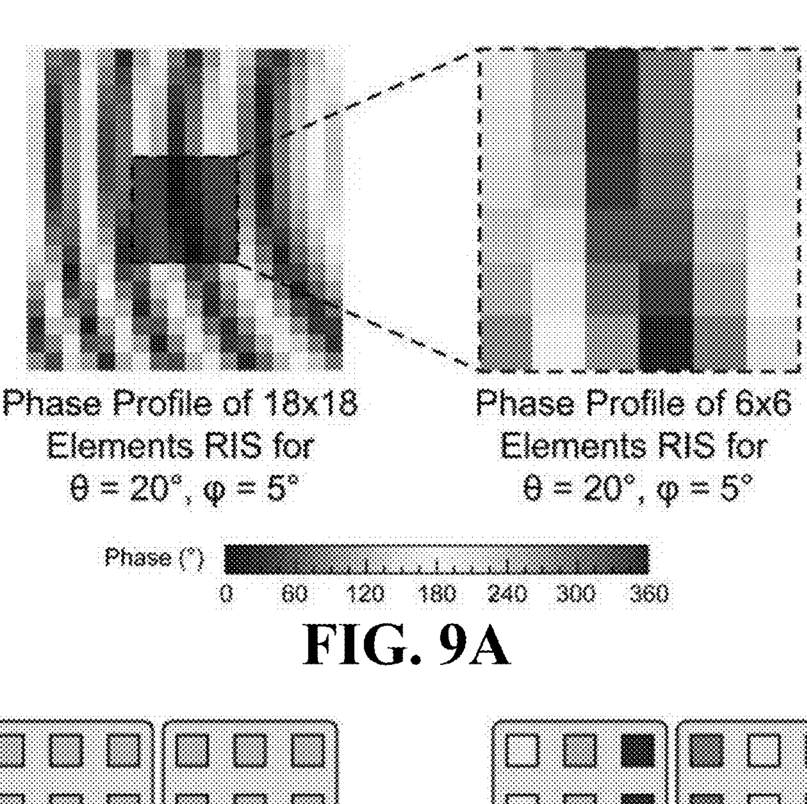
FIG. 9A is a representation of an example phase profiles of elements of reconfigurable intelligent surfaces, in accordance with various aspects and implementations of the subject disclosure.
Figure 9B:
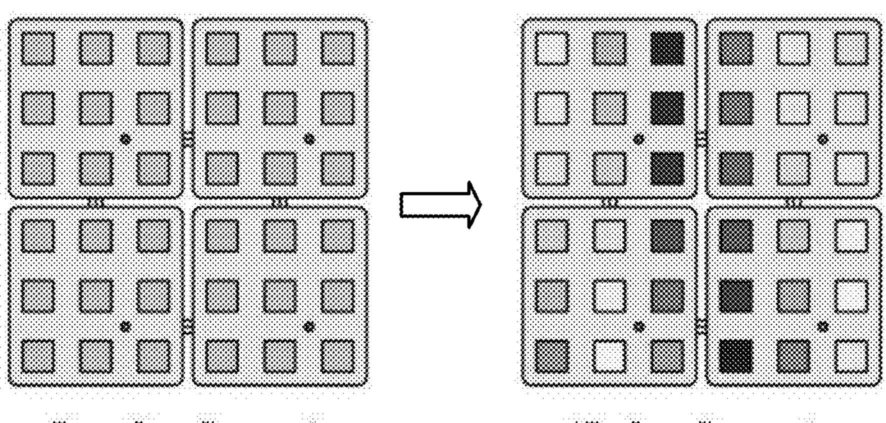
FIGS. 9B and 9C are representations of an example pre-configuration and post-configuration of a module (FIG. 9B) and corresponding pre-configuration and post-configuration beam reflection directions, in accordance with various aspects and implementations of the subject disclosure.
Figure 9C:
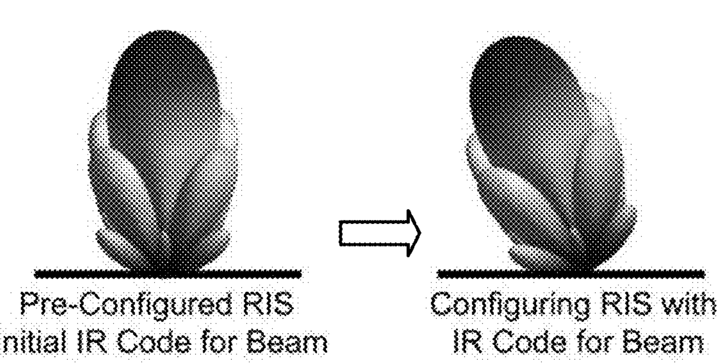

FIGS. 9A-9C show the phase profile for an 18×18 array reconfigurable intelligent surface corresponding to the reflected signal direction θ=20° (polar angle) and φ=5° (azimuth angle). As shown in FIG. 6A, a smaller section (a 6×6 array) from this phase profile provides the reflected signal in the same direction but with reduced signal gain. This phase profile is reflected on the 6×6 reconfigurable intelligent surface array in terms of voltage provided to the varactors. The reconfigurable intelligent surface panel is pre-configured to reflect in the direction θ=0° and φ=0°, and then can be reconfigured remotely in the desired direction (θ=20° and φ=5°) based on the IR instruction code sent remotely from IR transmitter. FIG. 9B represents the pre-configured and post-IR signal-configured states of a 2×2 array of the modules, and FIG. 9C shows the beam directions in the respective preconfigured and post-IR signal-configured states.

Figure 10:
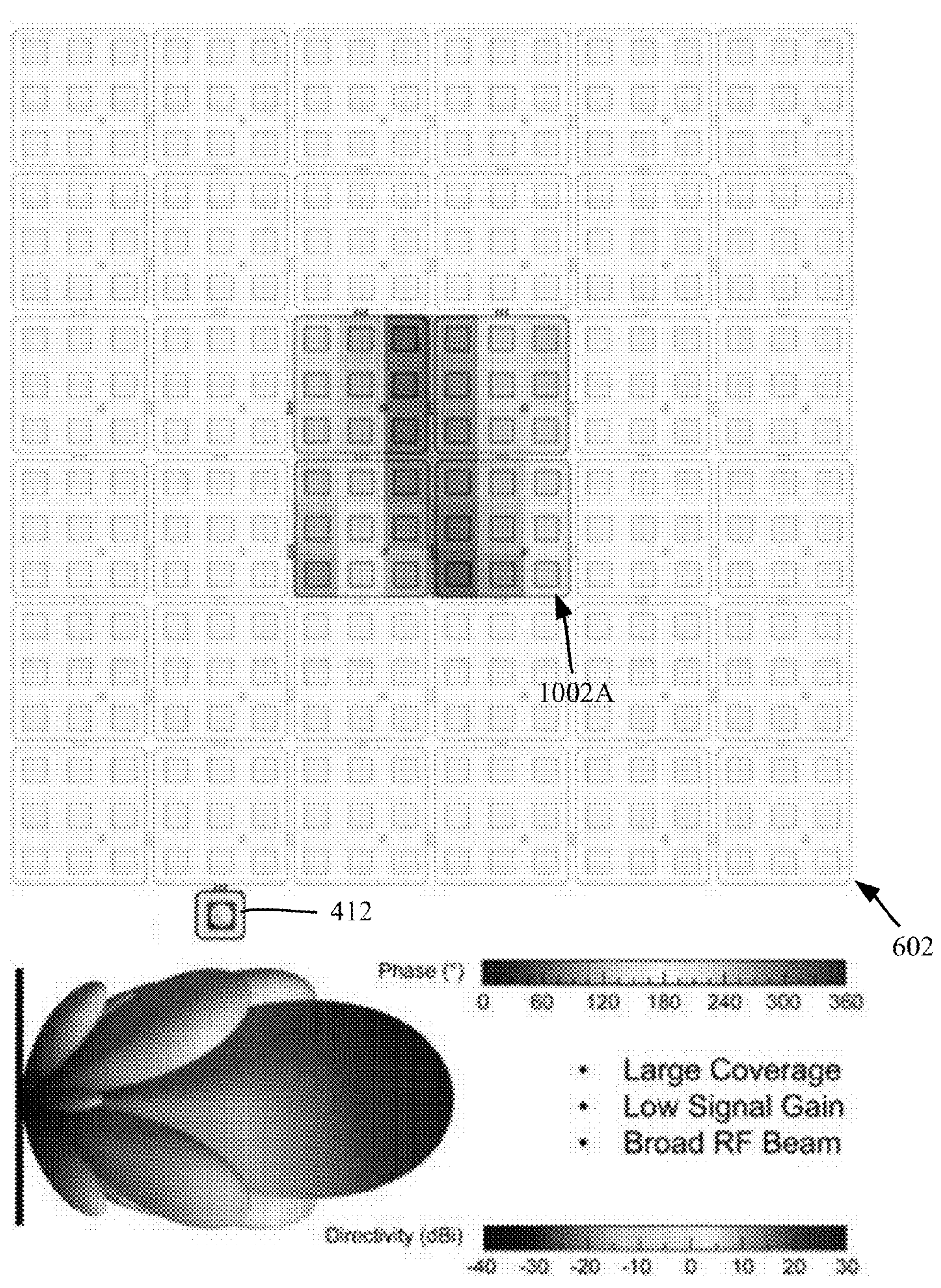
FIG. 10 is a representation of an example reconfigurable intelligent surface with a relatively smaller number of cells, which provides a relatively lower gain that is less directional and covers a relatively larger area, in accordance with various aspects and implementations of the subject disclosure.

FIG. 10 generally corresponds to FIG. 6, configuration 602A (FIG. 6)/1002A (FIG. 10), in which the reconfigurable intelligent surface 602 has a smaller number of active cells (smaller aperture), which provides a lower gain that is less directional and covers a larger area. This is suitable in scenarios when user equipment (UEs) are distributed over a larger area, for example.

Figure 11:
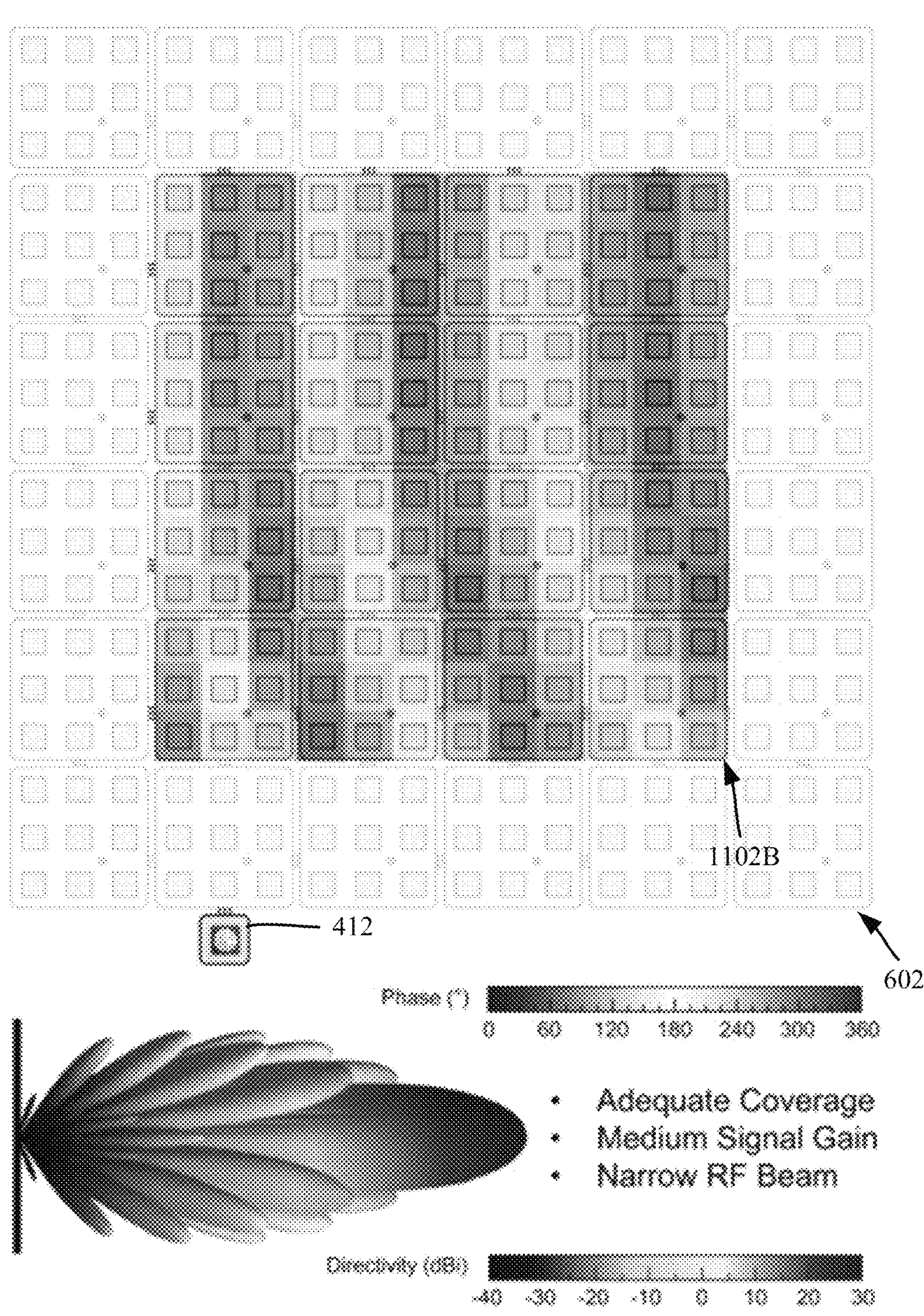
FIG. 11 is a representation of an example reconfigurable intelligent surface with an increased number of cells (relative to FIG. 10), which provides a relatively medium reflected signal gain and a relatively narrow RF beam that provides relatively medium coverage, in accordance with various aspects and implementations of the subject disclosure.

Increasing the reconfigurable intelligent surface aperture as shown in configuration 702B (FIG. 7)/1102B (FIG. 11) enhances the signal gain while making the reflected RF beam relatively narrower. In FIG. 11, the increase in the number of active aperture cells (relative to FIG. 10) in the reconfigurable intelligent surface 602 provides a medium reflected signal gain and a narrower RF beam. Such a reconfigurable intelligent surface configuration can provide an adequate coverage area while users can take advantage of the higher signal gain in another example scenario.

Figure 12:
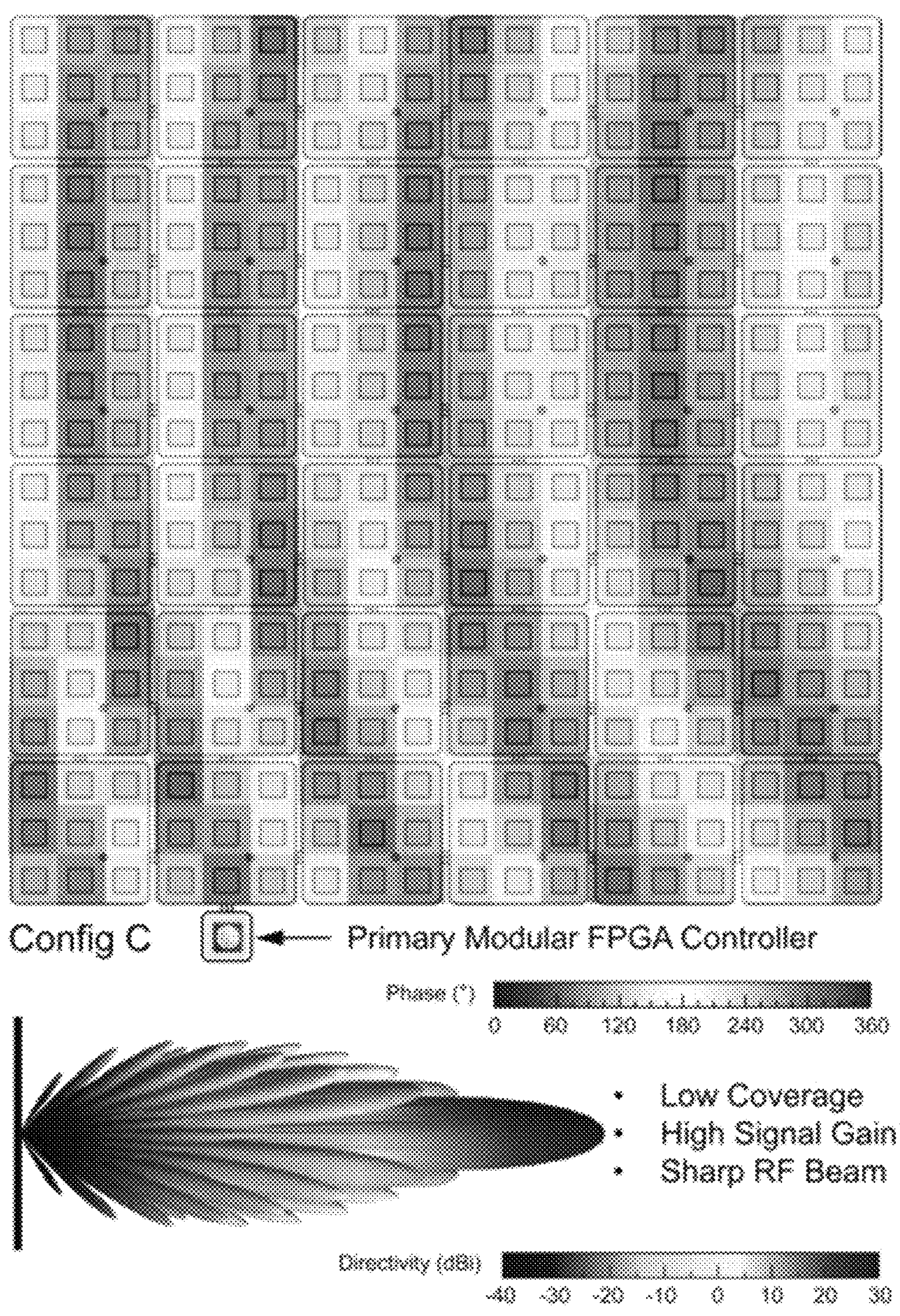
FIG. 12 is a representation of an example reconfigurable intelligent surface with an increased number of cells (relative to FIG. 11), showing how a phase profile spread over a large reconfigurable intelligent surface aperture provides a relatively sharp reflected RF beam that offers relatively very high signal gain, in accordance with various aspects and implementations of the subject disclosure.
Figure 13A:
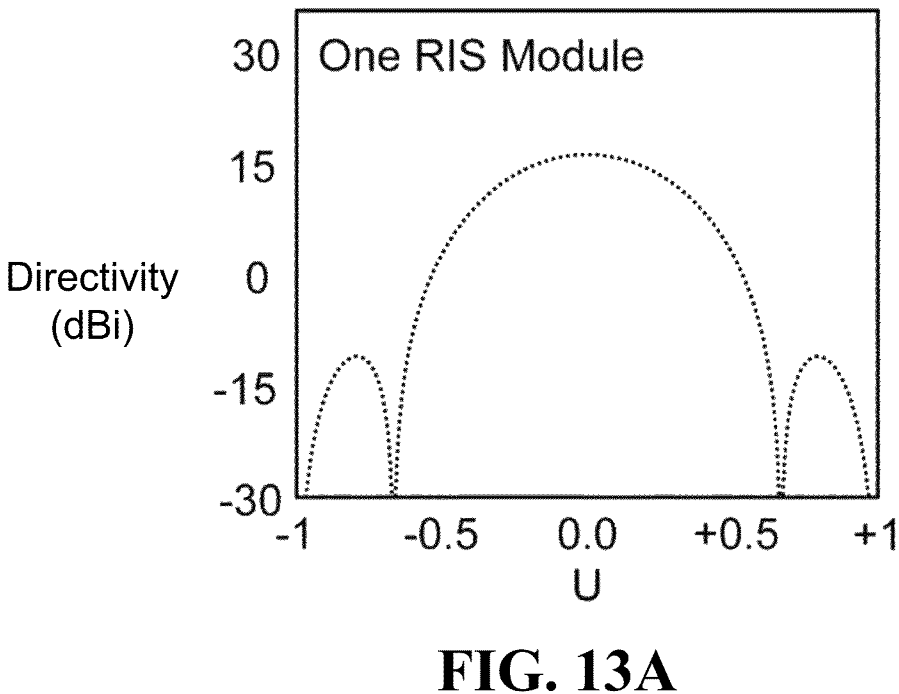
FIG. 13A is an example directivity diagram showing the signal gain and main lobe corresponding to one reconfigurable intelligent surface module (a 3×3 array of unit cells), in accordance with various aspects and implementations of the subject disclosure.
Figure 13B:
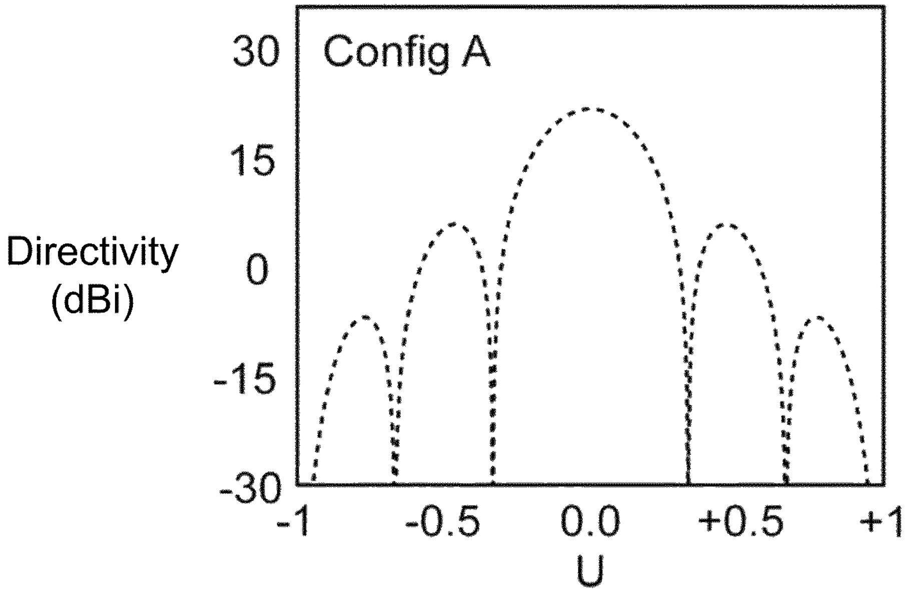
FIG. 13B is an example directivity diagram showing the signal gain and main lobe corresponding to one reconfigurable intelligent surface configuration (a 6×6 array), in accordance with various aspects and implementations of the subject disclosure.

In FIG. 12, which generally corresponds to FIG. 8 configuration 802C, as the RIS aperture is increased even further relative to FIG. 11, a very sharp, directional RF beam can be seen. In general, the phase profile spread over a large reconfigurable intelligent surface aperture provides a sharp reflected RF beam that offers very high signal gain but covers a smaller area. This is suitable for scenarios when UEs are clustered in a small area. As can be readily appreciated, FIGS. 10-12 depict only three nonlimiting examples, and other reconfigurable intelligent surfaces, such as with larger number of modules, can provide solutions for other solutions.

Figure 14A:
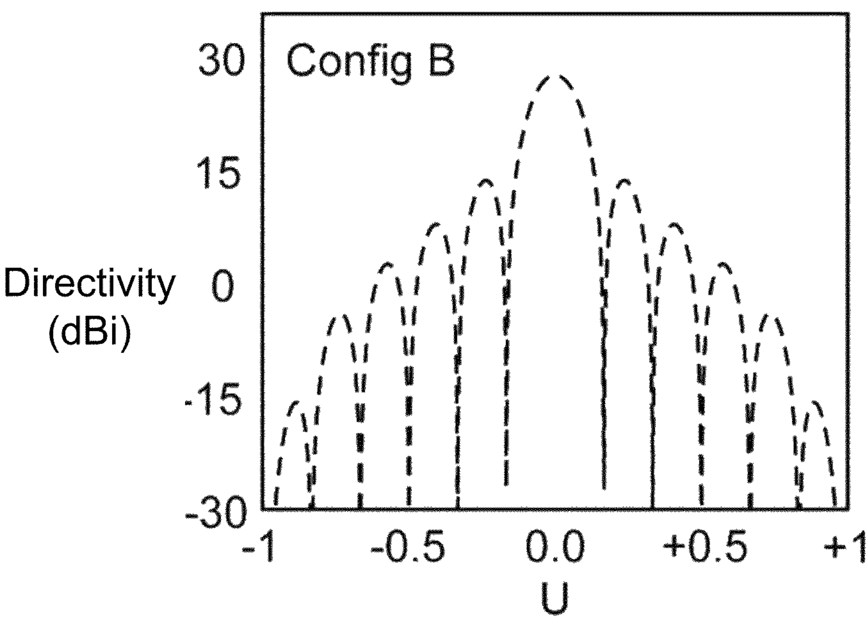
FIG. 14A is an example directivity diagram showing the signal gain and main lobe corresponding to another reconfigurable intelligent surface configuration (a 12×12 array), in accordance with various aspects and implementations of the subject disclosure.
Figure 14B:
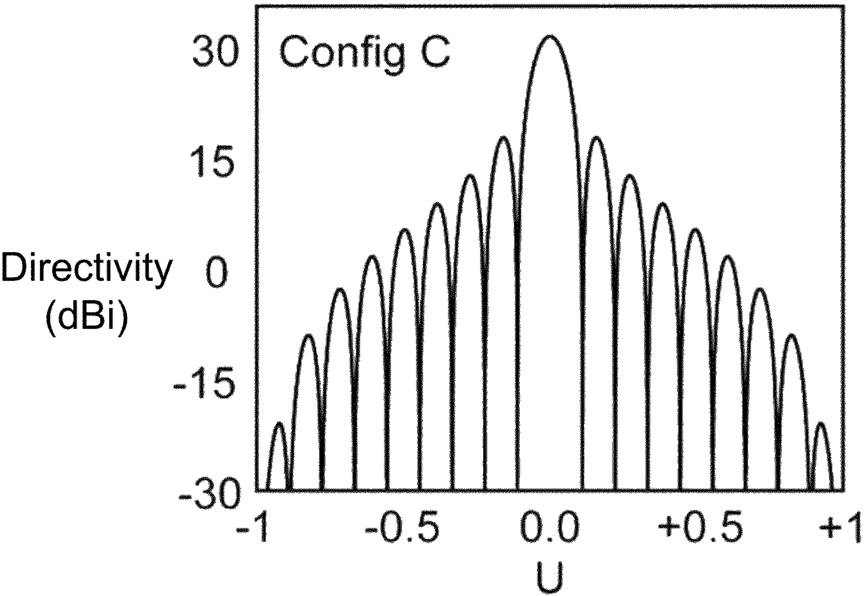
FIG. 14B is an example directivity diagram showing the signal gain and main lobe corresponding to yet another reconfigurable intelligent surface configuration (an 18×18 array), in accordance with various aspects and implementations of the subject disclosure.

FIGS. 13A, 13B, 14A and 14B show the directivity diagrams of the reflected signal from the reconfigurable intelligent surface aperture in different configurations, namely with one reconfigurable intelligent surface module (3×3 array) (FIG. 13A), configuration "A" (6×6 array) (FIG. 13B), configuration "B" (12×12 array) (FIG. 14A), and configuration "C" (18×18 array) (FIG. 14B). As can be seen, as the number of elements is increased in the reconfigurable intelligent surface array, the signal gain consequently increases, while the main lobe of the reflected beam subsequently becomes narrower.

Turning to some example usage scenarios, consider that in many scenarios obstructions seriously impede the links between access points (APs) and users. For example, with smart office and home spaces, indoor environments are often cluttered with many obstructions, including walls, furniture, and appliances, which can block or degrade the millimeter wave (mmWave) wireless signals, which are high frequency signals. Reconfigurable intelligent surface panels can be strategically installed on walls, ceilings, or other surfaces/locations, and can be used to reflect and steer directly blocked mmWave signals towards the shadow regions, thereby improving coverage. Thus, a reconfigurable intelligent surface can receive the mmWave signal from the indoor access point and redirect the signal to area(s) where the signal from the router is weak or non-existent.

As described herein, a reconfigurable intelligent surface can be reconfigured remotely using infrared control signals or the like. For example, a technician may be used to determine how many modules are needed for a reconfigurable intelligent surface, and where the reflected beam is to be directed for a given scenario. More modules than needed can be configured to allow for future expansion, with only the desired aperture active via gain control. The technician can enter a code/use a voice command and/or the like into the remote control, whereby the remote control sends the appropriate control signal to the modules, which then along with the primary controller reconfigure the reconfigurable intelligent surface accordingly. This configuration can remain in use (e.g., the technician takes the remote control) unless and until a change is deemed to be needed, whereby a technician can return to make the appropriate reconfiguration.

Moreover, the reconfigurable intelligent surface described herein not only improves the coverage but can also be used to improve the security of wireless communications. For example, by selectively directing signals, reconfigurable intelligent surfaces can minimize the possibility of eavesdropping. The passive beamforming from reconfigurable intelligent surface improves energy efficiency by reducing wasteful signal dispersion and directing the signal only where required. This concept can be easily extended to smart homes where reconfigurable intelligent surface can intelligently steer signals towards connected devices such as smart speakers, smart TVs, IoT (Internet of Things) sensors, and so on, even when these devices are located in hard-to-reach areas.

Figure 15:
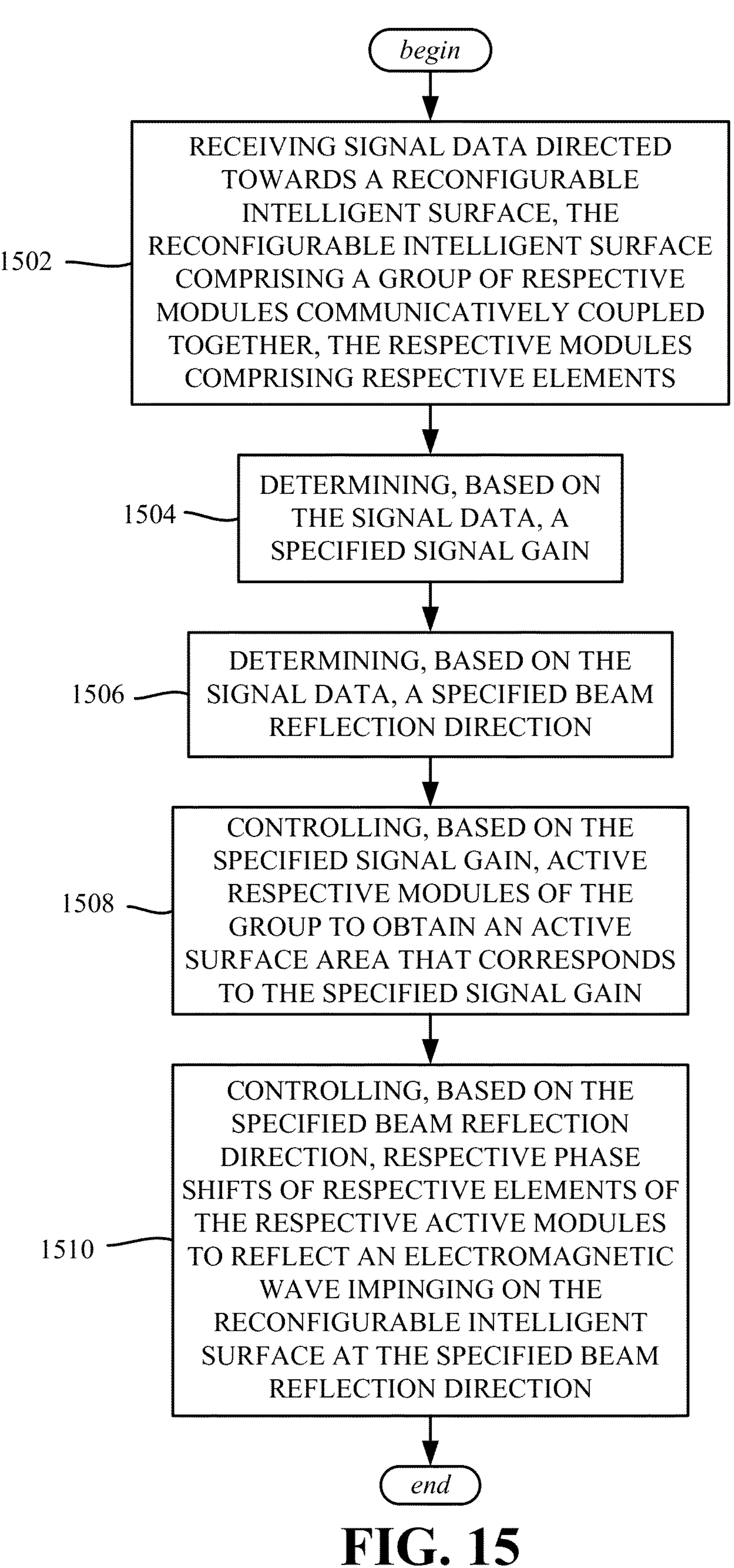
FIG. 15 is a flow diagram showing example operations related to controlling respective modules to reflect an electromagnetic wave as a beam based on specified signal gain data and specified beam reflection direction, in accordance with various aspects and implementations of the subject disclosure.

One or more aspects can be embodied in a system, such as represented in the example operations of FIG. 15, and for example can include a memory that stores computer executable components and/or operations, and a processor that executes computer executable components and/or operations stored in the memory. Example operations can include operation 1502, which represents receiving signal data directed towards a reconfigurable intelligent surface, the reconfigurable intelligent surface comprising a group of respective modules communicatively coupled together, the respective modules comprising respective elements. Example operation 1504 represents determining, based on the signal data, a specified signal gain. Example operation 1506 represents determining, based on the signal data, a specified beam reflection direction. Example operation 1508 represents controlling, based on the specified signal gain, active respective modules of the group to obtain an active surface area that corresponds to the specified signal gain. Example operation 1510 represents controlling, based on the specified beam reflection direction, respective phase shifts of respective elements of the respective active modules to reflect an electromagnetic wave impinging on the reconfigurable intelligent surface at the specified beam reflection direction.

The reconfigurable intelligent surface can be coupled to a controller that facilitates the activating of the active respective modules and the controlling of the respective phase shifts.

The respective modules can include respective microcontrollers coupled to the controller, the respective microcontrollers controlling the respective phase shifts of the respective elements of the respective active modules.

The respective microcontrollers can be coupled to memory that contains phase profile data for setting the respective phase shifts; the phase profile data can represent different selectable configurations of the reconfigurable intelligent surface that correspond to different beam reflection directions.

The respective elements can include respective tunable capacitors that are adjustable for controlling the respective phase shifts of the respective elements of the respective active modules.

The respective elements can include respective varactors that are voltage-adjustable for controlling the respective phase shifts of the respective elements of the respective active modules.

The respective modules of the group of respective modules can be configured with coupling terminals for physically coupling to one another.

The respective modules of the group of respective modules can be configured with magnetic coupling terminals for physical coupling to adjacent subgroups of the respective modules; the magnetic coupling terminals can further facilitate communication between modules of the respective modules.

The respective modules of the group of respective modules can include respective signal sensors that receive the signal data; the respective modules further can include respective synchronization components that synchronize information between modules of the respective modules based on the signal data.

The signal data can be encoded into an infrared signal, and the respective signal sensors can include infrared sensors.

The signal data can include a first bit pattern that represents the specified signal gain, and a second bit pattern that represents the specified beam reflection direction.

The respective elements can be arranged as respective square arrays on the respective modules.

The respective active modules can be arranged in a square pattern.

Figure 16:
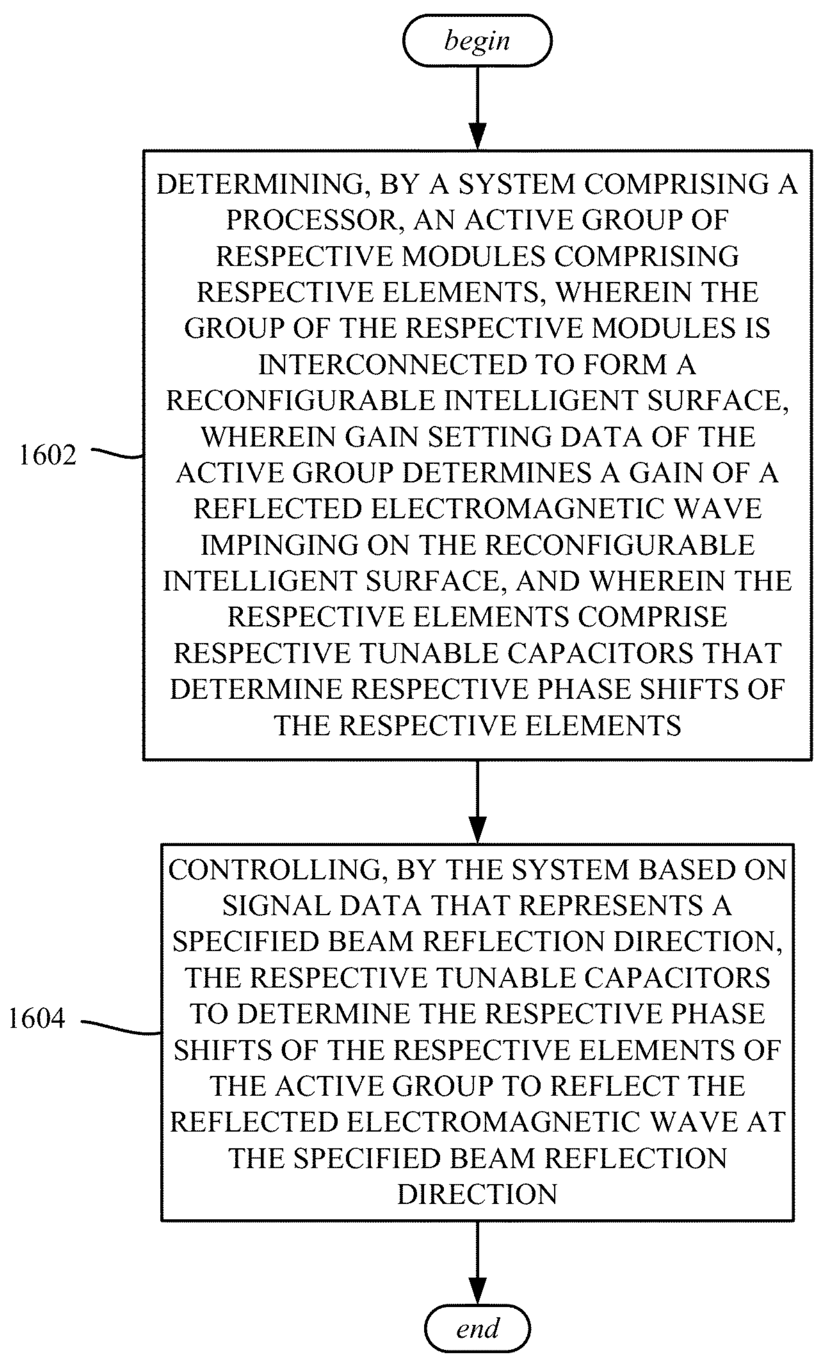
FIG. 16 is a flow diagram showing example operations related to controlling direction of a reflected beam by controlling phase shifts of elements via controlling tunable capacitors, in accordance with various aspects and implementations of the subject disclosure.

One or more example aspects, such as corresponding to example operations of a method, are represented in FIG. 16. Example operation 1602 represents determining, by a system comprising a processor, an active group of respective modules comprising respective elements, wherein the group of the respective modules is interconnected to form a reconfigurable intelligent surface, wherein gain setting data of the active group determines a gain of a reflected electromagnetic wave impinging on the reconfigurable intelligent surface, and wherein the respective elements can include respective tunable capacitors that determine respective phase shifts of the respective elements. Example operation 1604 represents controlling, by the system based on signal data that represents a specified beam reflection direction, the respective tunable capacitors to determine the respective phase shifts of the respective elements of the active group to reflect the reflected electromagnetic wave at the specified beam reflection direction.

Determining the active group of the respective modules can be based on specified gain information.

Determining the active group of the respective can be based on specified gain information obtained via the signal data.

Figure 17:
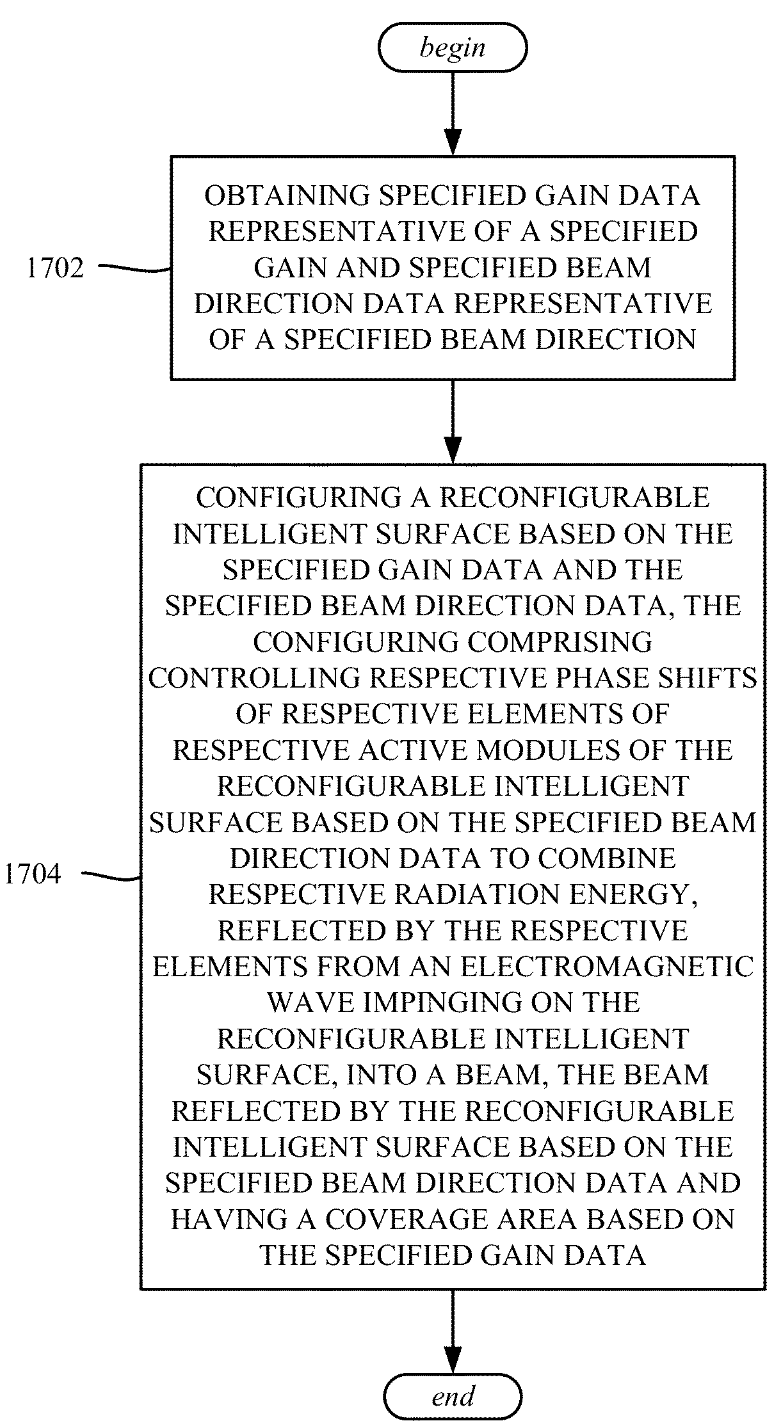
FIG. 17 is a flow diagram showing example operations related to configuring a reconfigurable intelligent surface based on specified gain data and specified beam direction data, including controlling respective phase shifts of respective elements of respective active modules of the reconfigurable intelligent surface, in accordance with various aspects and implementations of the subject disclosure.

FIG. 17 summarizes various example operations, e.g., corresponding to a machine-readable medium, comprising executable instructions that, when executed by a processor, facilitate performance of operations. Example operation 1702 represents obtaining specified gain data representative of a specified gain and specified beam direction data representative of a specified beam direction. Example operation 1704 represents configuring a reconfigurable intelligent surface based on the specified gain data and the specified beam direction data, the configuring comprising controlling respective phase shifts of respective elements of respective active modules of the reconfigurable intelligent surface based on the specified beam direction data to combine respective radiation energy, reflected by the respective elements from an electromagnetic wave impinging on the reconfigurable intelligent surface, into a beam, the beam reflected by the reconfigurable intelligent surface based on the specified beam direction data and having a coverage area based on the specified gain data.

Obtaining the specified gain data and the specified beam direction data can include receiving a signal at the reconfigurable intelligent surface.

Obtaining the specified gain data and the specified beam direction data can include receiving, by at least one infrared sensor, infrared signal data comprising the specified gain data and the specified beam direction data.

Obtaining the specified gain data and the specified beam direction data can include receiving signal data comprising a first bit pattern representing the specified gain data and a second bit pattern representing the specified beam direction data.

As can be seen, the technology described herein facilitates customizable reconfigurable intelligent surface configurations, via remote control of both signal strength and beam direction. The modular design of the modules enables straightforward assembly and aperture scalability. Reconfigurable intelligent surface configurations can be changed by using a control signal (e.g., a binary sequence transmitted by an infrared transmitter and received by infrared receiver(s) and overseen by the primary controller. Upon detecting the control signal, the controller guides the microcontrollers in each module to produce driving voltages for the integrated varactors, whereby the phase profile on the reconfigurable intelligent surface aperture and the resulting reflected beam direction and shape can be controlled remotely.

The remotely controlled reconfigurable intelligent surface described herein can dynamically adapt to changes (in terms of signal strength and the width of coverage offered) to better optimize wireless communications in various scenarios. Remotely controlled reconfigurable intelligent surface can be deployed in hard-to-reach or inaccessible locations, without the requirement for frequent physical intervention. By remotely tuning the reconfigurable intelligent surface, the technology described herein can improve signal strength, reduce interference, and enhance the overall quality of service. For advanced wireless applications, such as the Internet of Things (IoT), the remote control capability and modular design can contribute to building a responsive network directed to the varied demands of such applications. As described herein, the reconfigurable intelligent surfaces can be updated or reconfigured as needed, ensuring that they remain relevant and effective in future scenarios.

Figure 18:
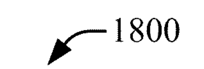
FIG. 18 is a block diagram representing an example computing environment into which aspects of the subject matter described herein may be incorporated.
Figure 18:
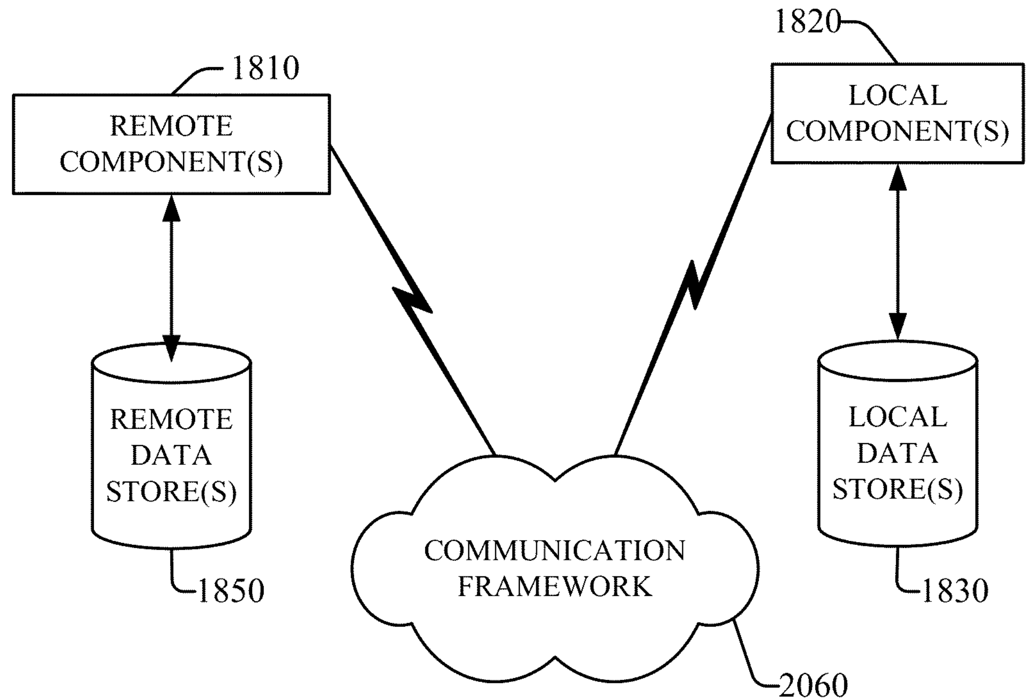

FIG. 18 is a schematic block diagram of a computing environment 1800 with which the disclosed subject matter can interact. The system 1800 comprises one or more remote component(s) 1810. The remote component(s) 1810 can be hardware and/or software (e.g., threads, processes, computing devices). In some embodiments, remote component(s) 1810 can be a distributed computer system, connected to a local automatic scaling component and/or programs that use the resources of a distributed computer system, via communication framework 1840. Communication framework 1840 can comprise wired network devices, wireless network devices, mobile devices, wearable devices, radio access network devices, gateway devices, femtocell devices, servers, etc.

The system 1800 also comprises one or more local component(s) 1820. The local component(s) 1820 can be hardware and/or software (e.g., threads, processes, computing devices). In some embodiments, local component(s) 1820 can comprise an automatic scaling component and/or programs that communicate/use the remote resources 1810, etc., connected to a remotely located distributed computing system via communication framework 1840.

One possible communication between a remote component(s) 1810 and a local component(s) 1820 can be in the form of a data packet adapted to be transmitted between two or more computer processes. Another possible communication between a remote component(s) 1810 and a local component(s) 1820 can be in the form of circuit-switched data adapted to be transmitted between two or more computer processes in radio time slots. The system 1800 comprises a communication framework 1840 that can be employed to facilitate communications between the remote component(s) 1810 and the local component(s) 1820, and can comprise an air interface, e.g., Uu interface of a UMTS network, via a long-term evolution (LTE) network, etc. Remote component(s) 1810 can be operably connected to one or more remote data store(s) 1850, such as a hard drive, solid state drive, SIM card, device memory, etc., that can be employed to store information on the remote component(s) 1810 side of communication framework 1840. Similarly, local component(s) 1820 can be operably connected to one or more local data store(s) 1830, that can be employed to store information on the local component(s) 1820 side of communication framework 1840.

Figure 19:
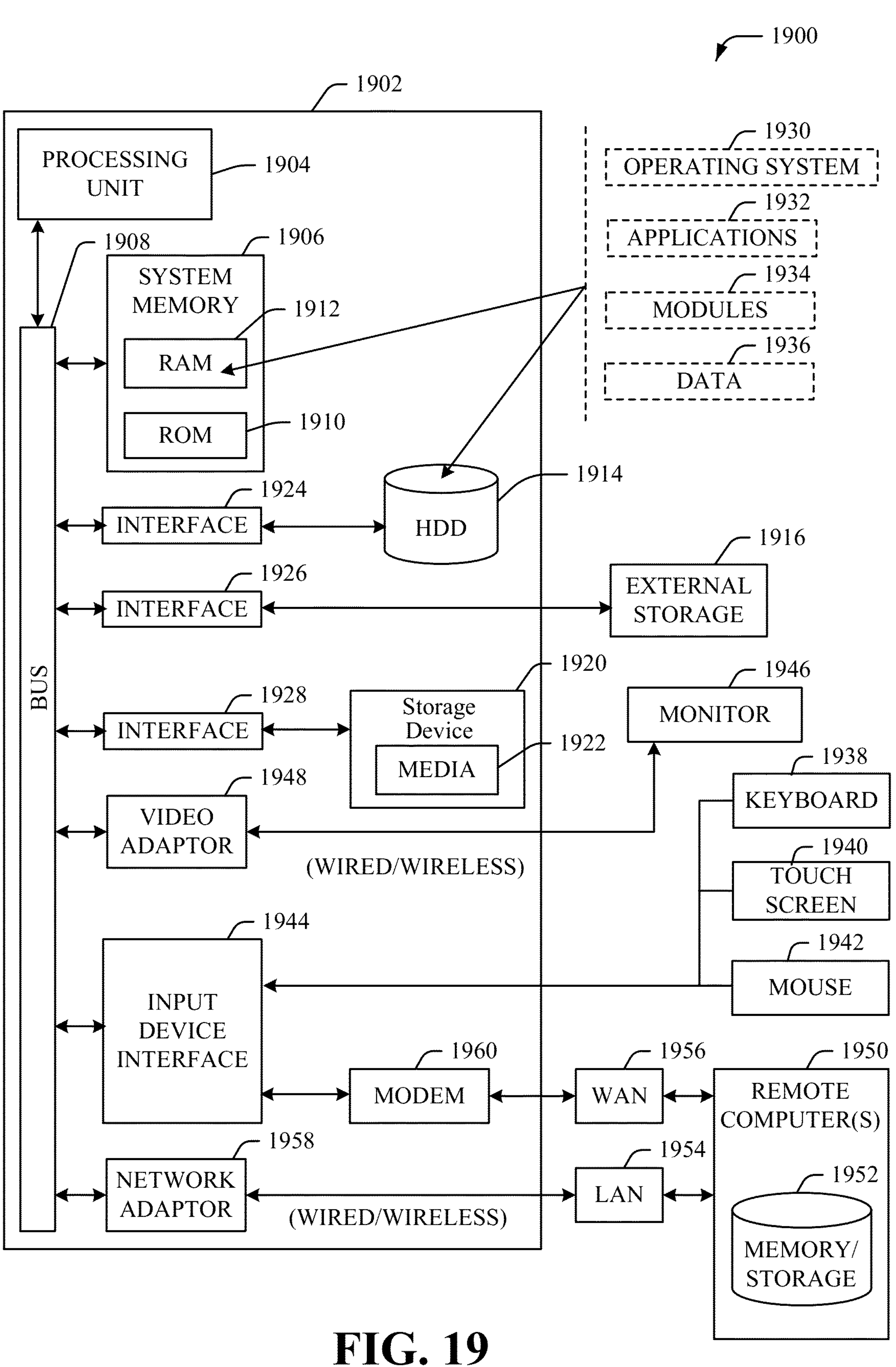
FIG. 19 depicts an example schematic block diagram of a computing environment with which the disclosed subject matter can interact/be implemented at least in part, in accordance with various aspects and implementations of the subject disclosure.

In order to provide additional context for various embodiments described herein, FIG. 19 and the following discussion are intended to provide a brief, general description of a suitable computing environment 1900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19, the example environment 1900 for implementing various embodiments of the aspects described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), and can include one or more external storage devices 1916 (e.g., a magnetic floppy disk drive (FDD) 1916, a memory stick or flash drive reader, a memory card reader, etc.). While the internal HDD 1914 is illustrated as located within the computer 1902, the internal HDD 1914 can also be configured for external use in a suitable chassis (not shown). Additionally, while not shown in environment 1900, a solid state drive (SSD) could be used in addition to, or in place of, an HDD 1914.

Other internal or external storage can include at least one other storage device 1920 with storage media 1922 (e.g., a solid state storage device, a nonvolatile memory device, and/or an optical disk drive that can read or write from removable media such as a CD-ROM disc, a DVD, a BD, etc.). The external storage 1916 can be facilitated by a network virtual machine. The HDD 1914, external storage device(s) 1916 and storage device (e.g., drive) 1920 can be connected to the system bus 1908 by an HDD interface 1924, an external storage interface 1926 and a drive interface 1928, respectively.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In such an embodiment, operating system 1930 can comprise one virtual machine (virtual machine) of multiple virtual machines hosted at computer 1902. Furthermore, operating system 1930 can provide runtime environments, such as the Java runtime environment or the .NET framework, for applications 1932. Runtime environments are consistent execution environments that allow applications 1932 to run on any operating system that includes the runtime environment. Similarly, operating system 1930 can support containers, and applications 1932 can be in the form of containers, which are lightweight, standalone, executable packages of software that include, e.g., code, runtime, system tools, system libraries and settings for an application.

Further, computer 1902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1902, e.g., applied at the application execution level or at the operating system (OS) kernel level, thereby enabling security at any level of code execution.

A user can enter commands and information into the computer 1902 through one or more wired/wireless input devices, e.g., a keyboard 1938, a touch screen 1940, and a pointing device, such as a mouse 1942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1904 through an input device interface 1944 that can be coupled to the system bus 1908, but can be connected by other interfaces, such as a parallel port, an IEEE 1994 serial port, a game port, a USB port, an IR interface, a BLUETOOTH® interface, etc.

A monitor 1946 or other type of display device can be also connected to the system bus 1908 via an interface, such as a video adapter 1948. In addition to the monitor 1946, a computer typically includes other peripheral output devices (not shown), such as speakers, printers, etc.

The computer 1902 can operate in a networked environment using logical connections via wired and/or wireless communications to one or more remote computers, such as a remote computer(s) 1950. The remote computer(s) 1950 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1952 is illustrated. The logical connections depicted include wired/wireless connectivity to a local area network (LAN) 1954 and/or larger networks, e.g., a wide area network (WAN) 1956. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 can be connected to the local network 1954 through a wired and/or wireless communication network interface or adapter 1958. The adapter 1958 can facilitate wired or wireless communication to the LAN 1954, which can also include a wireless access point (AP) disposed thereon for communicating with the adapter 1958 in a wireless mode.

When used in a WAN networking environment, the computer 1902 can include a modem 1960 or can be connected to a communications server on the WAN 1956 via other means for establishing communications over the WAN 1956, such as by way of the Internet. The modem 1960, which can be internal or external and a wired or wireless device, can be connected to the system bus 1908 via the input device interface 1944. In a networked environment, program modules depicted relative to the computer 1902 or portions thereof, can be stored in the remote memory/storage device 1952. It will be appreciated that the network connections shown are examples and other means of establishing a communications link between the computers can be used.

When used in either a LAN or WAN networking environment, the computer 1902 can access cloud storage systems or other network-based storage systems in addition to, or in place of, external storage devices 1916 as described above. Generally, a connection between the computer 1902 and a cloud storage system can be established over a LAN 1954 or WAN 1956 e.g., by the adapter 1958 or modem 1960, respectively. Upon connecting the computer 1902 to an associated cloud storage system, the external storage interface 1926 can, with the aid of the adapter 1958 and/or modem 1960, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, the operations comprising:

receiving signal data directed towards a reconfigurable intelligent surface, the reconfigurable intelligent surface comprising a group of respective modules tiled together to form a scalable aperture, the respective modules being interconnected and communicatively coupled together to synchronize the signal data among the group of respective modules, the respective modules comprising respective elements;

determining, based on the signal data, a specified signal gain;

determining, based on the signal data, a specified beam reflection direction;

controlling, based on the specified signal gain, a quantity of active respective modules of the group to obtain an active surface area of the scalable aperture that corresponds to the specified signal gain; and controlling, based on the specified beam reflection direction, respective phase shifts of respective elements of the respective active modules to reflect an electromagnetic wave impinging on the reconfigurable intelligent surface at the specified beam reflection direction.

2. The system of claim 1, wherein the reconfigurable intelligent surface is coupled to a controller that facilitates the activating of the active respective modules and the controlling of the respective phase shifts.

3. The system of claim 2, wherein the respective modules comprise respective microcontrollers coupled to the controller, the respective microcontrollers controlling the respective phase shifts of the respective elements of the respective active modules.

4. The system of claim 1, wherein the respective microcontrollers are coupled to memory that contains phase profile data for setting the respective phase shifts, the phase profile data representing different selectable configurations of the reconfigurable intelligent surface that correspond to different beam reflection directions.

5. The system of claim 1, wherein the respective elements comprise respective tunable capacitors that are adjustable for controlling the respective phase shifts of the respective elements of the respective active modules.

6. The system of claim 1, wherein the respective elements comprise respective varactors that are voltage-adjustable for controlling the respective phase shifts of the respective elements of the respective active modules.

7. The system of claim 1, wherein the respective modules of the group of respective modules are configured with coupling terminals for physically coupling to one another.

8. The system of claim 1, wherein the respective modules of the group of respective modules are configured with magnetic coupling terminals for physical coupling to adjacent subgroups of the respective modules, the magnetic coupling terminals further facilitating communication between modules of the respective modules.

9. The system of claim 1, wherein the respective modules of the group of respective modules comprise respective signal sensors that receive the signal data, the respective modules further comprising respective synchronization components that synchronize information between modules of the respective modules based on the signal data.

10. The system of claim 1, wherein the signal data is encoded into an infrared signal, and wherein the respective signal sensors comprise infrared sensors.

11. The system of claim 1, wherein the signal data comprises a first bit pattern that represents the specified signal gain, and a second bit pattern that represents the specified beam reflection direction.

12. The system of claim 1, wherein the respective elements are arranged as respective square arrays on the respective modules.

13. The system of claim 1, wherein the respective active modules are arranged in a square pattern.

14. A method, comprising:

determining, by a system comprising at least one processor, an active group of respective modules comprising respective elements, wherein the active group of respective modules is tiled together to form a scalable aperture, wherein the active group of the respective modules is interconnected to form a reconfigurable intelligent surface, wherein the respective modules are communicatively coupled together to synchronize signal data among the active group of respective modules, wherein gain setting data of the active group determines a gain of a reflected electromagnetic wave impinging on the reconfigurable intelligent surface and a quantity of active respective modules of the active group, and wherein the respective elements comprise respective tunable capacitors that determine respective phase shifts of the respective elements; and controlling, by the system based on the signal data that represents a specified beam reflection direction, the respective tunable capacitors to determine the respective phase shifts of the respective elements of the active group to reflect the reflected electromagnetic wave at the specified beam reflection direction.

15. The method of claim 14, wherein the determining of the active group of the respective modules is based on specified gain information.

16. The method of claim 14, wherein the determining of the active group of the respective modules is based on specified gain information obtained via the signal data.

17. A non-transitory machine-readable medium, comprising executable instructions that, when executed by at least one processor, facilitate performance of operations, the operations comprising:

obtaining specified gain data representative of a specified gain and specified beam direction data representative of a specified beam direction;

synchronizing the specified gain data and the specified beam direction data among discrete modules of a reconfigurable intelligent surface via inter-module communicative coupling, wherein the discrete modules are tiled together to form a scalable aperture; and configuring the reconfigurable intelligent surface based on the specified gain data and the specified beam direction data, the configuring comprising:

controlling, based on the specified gain data, a quantity of active respective modules of the discrete modules to obtain an active surface area of the scalable aperture that corresponds to the specified gain data, and controlling respective phase shifts of respective elements of the respective active modules of the reconfigurable intelligent surface based on the specified beam direction data to combine respective radiation energy, reflected by the respective elements from an electromagnetic wave impinging on the reconfigurable intelligent surface, into a beam, the beam reflected by the reconfigurable intelligent surface based on the specified beam direction data and having a coverage area based on the specified gain data.

18. The non-transitory machine-readable medium of claim 17, wherein the obtaining of the specified gain data and the specified beam direction data comprises receiving a signal at the reconfigurable intelligent surface.

19. The non-transitory machine-readable medium of claim 17, wherein the obtaining of the specified gain data and the specified beam direction data comprises receiving, by at least one infrared sensor, infrared signal data comprising the specified gain data and the specified beam direction data.

20. The non-transitory machine-readable medium of claim 17, wherein the obtaining of the specified gain data and the specified beam direction data comprises receiving signal data comprising a first bit pattern representing the specified gain data and a second bit pattern representing the specified beam direction data.

* * * * *